(12) United States Patent
Miller et al.

(10) Patent No.: US 7,220,944 B2
(45) Date of Patent: May 22, 2007

(54) MODULAR COOKING OVEN AND RELATED METHODS

(76) Inventors: R. Craig Miller, 16532 Somerset La., Huntington Beach, CA (US) 92649; Richard W. Naess, 22601 Allview Ter., Laguna Beach, CA (US) 92651

( * ) Notice: Subject to any disclaimer, the term of this patent is extended or adjusted under 35 U.S.C. 154(b) by 65 days.

(21) Appl. No.: 11/148,669

(22) Filed: Jun. 8, 2005

(65) Prior Publication Data

US 2006/0163238 A1    Jul. 27, 2006

Related U.S. Application Data

(60) Provisional application No. 60/647,690, filed on Jan. 26, 2005.

(51) Int. Cl.
  *F27B 9/10* (2006.01)
  *F27B 9/02* (2006.01)
  *F27B 9/36* (2006.01)

(52) U.S. Cl. ................ 219/388; 219/394; 219/400; 126/21 A; 99/443 C

(58) Field of Classification Search ............. 432/171
  See application file for complete search history.

(56) References Cited

U.S. PATENT DOCUMENTS

| | | | | |
|---|---|---|---|---|
| 1,517,271 | A | * | 12/1924 | Woodson ................. 219/388 |
| 1,519,287 | A | * | 12/1924 | Woodson ................. 219/388 |
| 2,529,253 | A | * | 11/1950 | Hoffman et al. ............ 99/386 |
| 3,604,336 | A | | 9/1971 | Straub et al. |
| 3,721,178 | A | | 3/1973 | Szabrak et al. |
| 3,727,801 | A | | 4/1973 | Caridis et al. |
| 3,815,488 | A | | 6/1974 | Van Dyk, Jr. et al. |
| 3,823,660 | A | | 7/1974 | Nerthling |
| 3,908,533 | A | | 9/1975 | Fagerstrom et al. |
| 3,943,910 | A | | 3/1976 | White |
| 3,947,241 | A | | 3/1976 | Caridis et al. |
| 4,026,201 | A | | 5/1977 | Fetzer |
| 4,055,677 | A | | 10/1977 | White |
| 4,121,509 | A | | 10/1978 | Baker et al. |
| 4,154,861 | A | | 5/1979 | Smith |

(Continued)

OTHER PUBLICATIONS

U.S. Appl. No. 10/347,543, filed Jan. 16, 2003, Miller, R. Craig, et al.

(Continued)

*Primary Examiner*—Joseph Pelham
(74) *Attorney, Agent, or Firm*—Ganz Law, P.C.

(57) ABSTRACT

An improved, modular convection/impingement oven assembly for continuously cooking food. In certain embodiments, the assembly comprises at least one non-recirculating impingement oven unit and at least one additional oven unit, arranged as a series, in any sequence. A first oven has an elongated chamber, a conveyer system, hot-air impingement units, and an exhaust vent at the discharge end. Preferably, it has surface-treatment burners for browning, a brander for grill marks, and/or steam nozzles for introducing heat and moisture. Cooking vapors pass the entire length of the unit. Each subsequent oven may be similar to the first oven (often omitting the surface-treatment burners and brander) with its own vent. Each subsequent oven may cook by flame, air, or steam, in any combination. Each oven unit is independently controllable for cooking parameters and cooking methods. An air gap may be provided between each pair of oven units to decouple airflow between units.

9 Claims, 15 Drawing Sheets

U.S. PATENT DOCUMENTS

| | | | |
|---|---|---|---|
| 4,167,585 A | 9/1979 | Caridis et al. | |
| 4,297,942 A | 11/1981 | Benson et al. | |
| 4,368,664 A | 1/1983 | Smith et al. | |
| 4,433,621 A * | 2/1984 | Van Wyk et al. | 101/11 |
| 4,457,291 A | 7/1984 | Henke | |
| 4,462,383 A | 7/1984 | Henke et al. | |
| 4,472,887 A * | 9/1984 | Avedian et al. | 432/128 |
| 4,479,776 A | 10/1984 | Smith | |
| 4,523,391 A | 6/1985 | Smith et al. | |
| 4,556,043 A | 12/1985 | Bratton | |
| 4,563,945 A | 1/1986 | Hwang | |
| 4,679,542 A | 7/1987 | Smith et al. | |
| 4,701,340 A | 10/1987 | Bratton et al. | |
| 4,831,238 A | 5/1989 | Smith et al. | |
| 4,867,051 A | 9/1989 | Schalk | |
| 4,936,286 A | 6/1990 | Baker | |
| 4,949,629 A | 8/1990 | Leary et al. | |
| RE33,374 E | 10/1990 | Bhattacharjee | |
| 4,965,435 A | 10/1990 | Smith et al. | |
| 4,991,497 A | 2/1991 | Barkhau et al. | |
| 5,075,120 A | 12/1991 | Leary et al. | |
| 5,560,952 A | 10/1996 | Miller et al. | |
| 5,786,566 A | 7/1998 | Miller et al. | |
| 5,942,142 A * | 8/1999 | Forney et al. | 219/388 |
| 6,132,783 A * | 10/2000 | Rajapakse | 99/443 C |
| 6,142,066 A * | 11/2000 | Anders et al. | 99/482 |
| 6,323,462 B1 * | 11/2001 | Strand | 219/388 |
| 7,107,899 B2 * | 9/2006 | Nothum, Jr. | 99/443 C |

OTHER PUBLICATIONS

Miller, Declaration of R. Craig Miller, Dec. 11, 2002.
Naess, Declaration of Richard W. Naess, Dec. 10, 2002.
Averill, Declaration of Edgar W. Averill, Nov. 5, 2002.
Exhibit A, referenced in the above Miller, Naess, and Averill declarations, four pages.

* cited by examiner

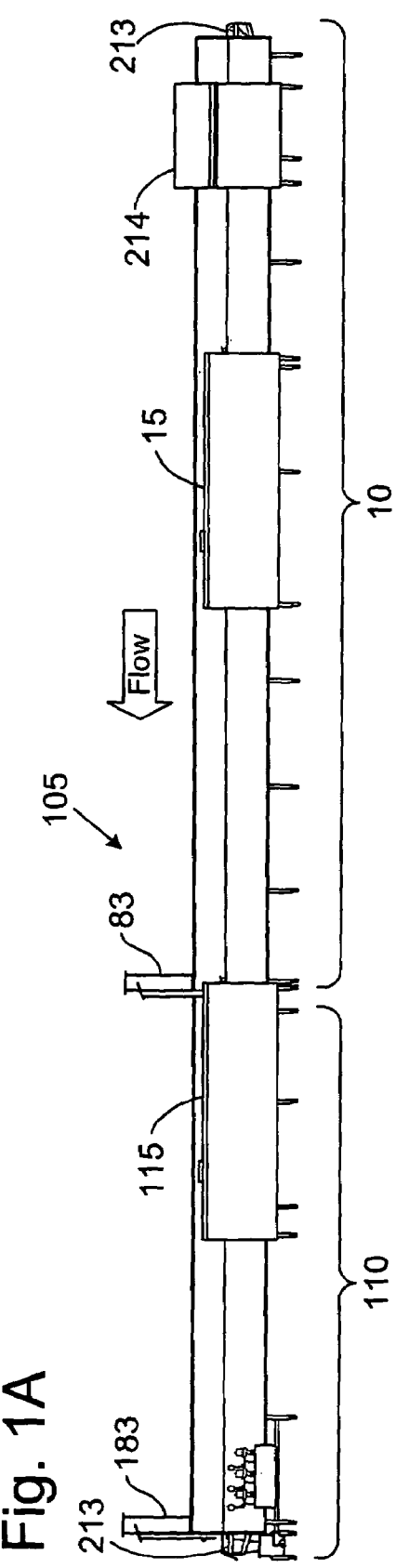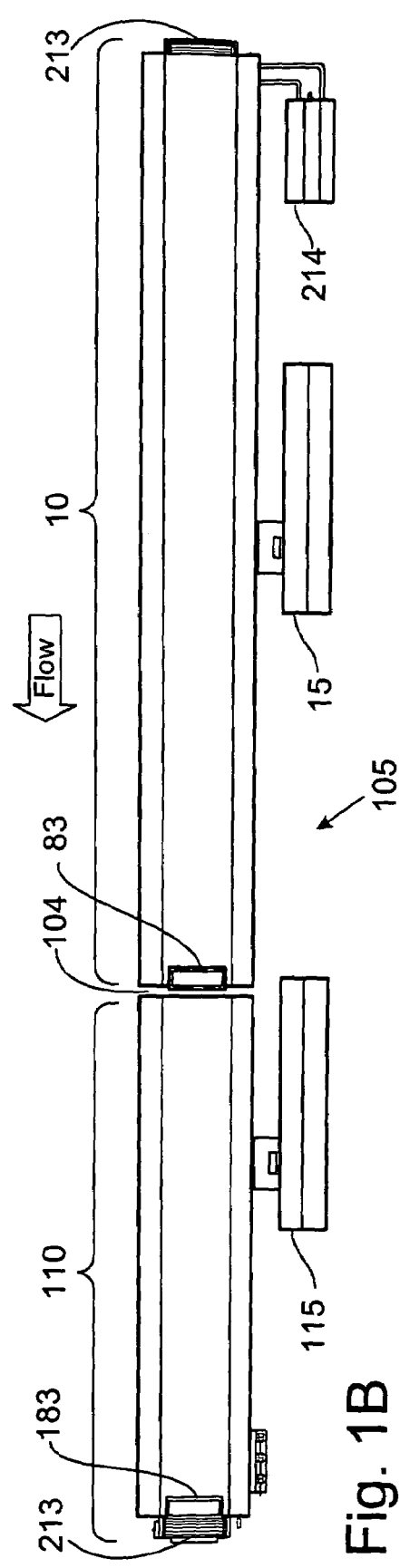

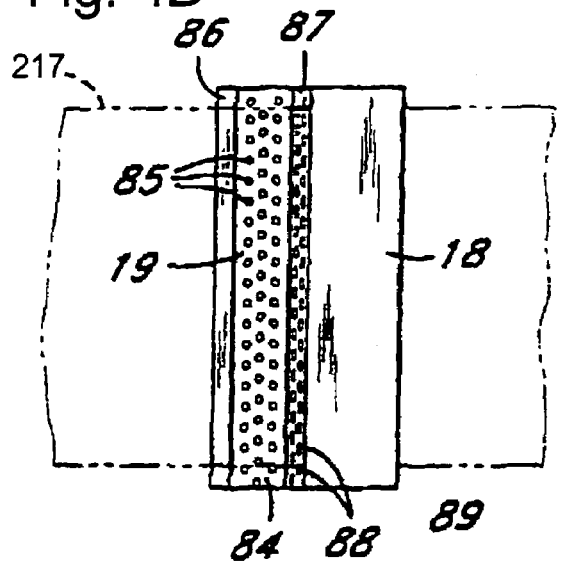
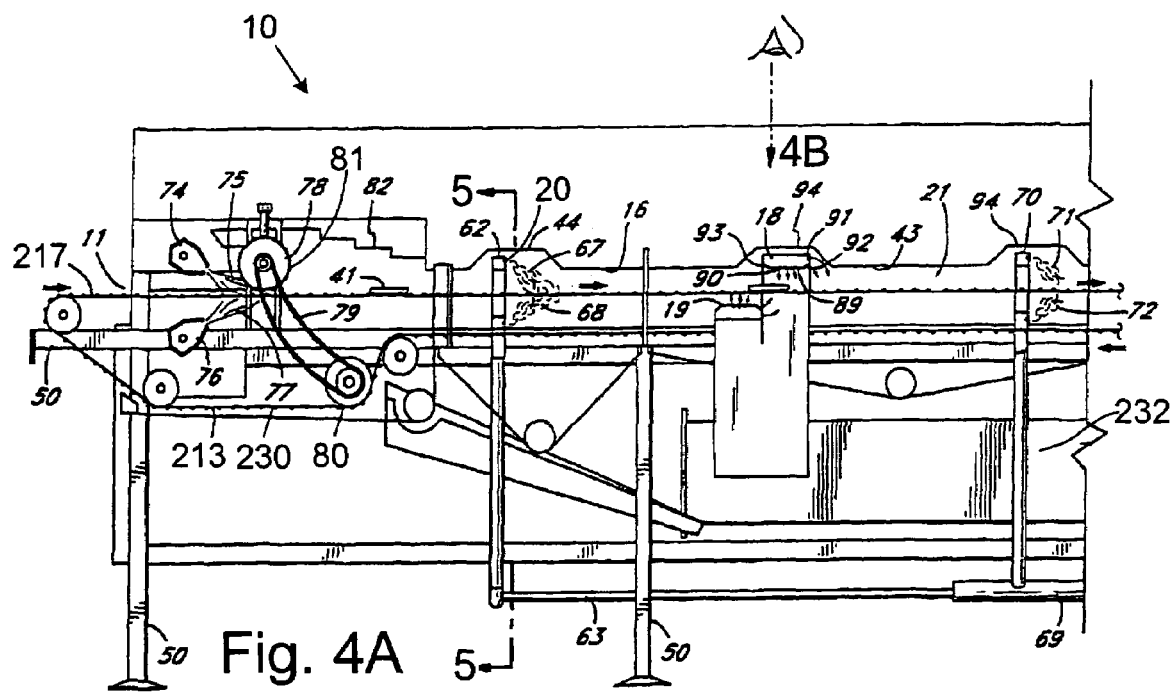

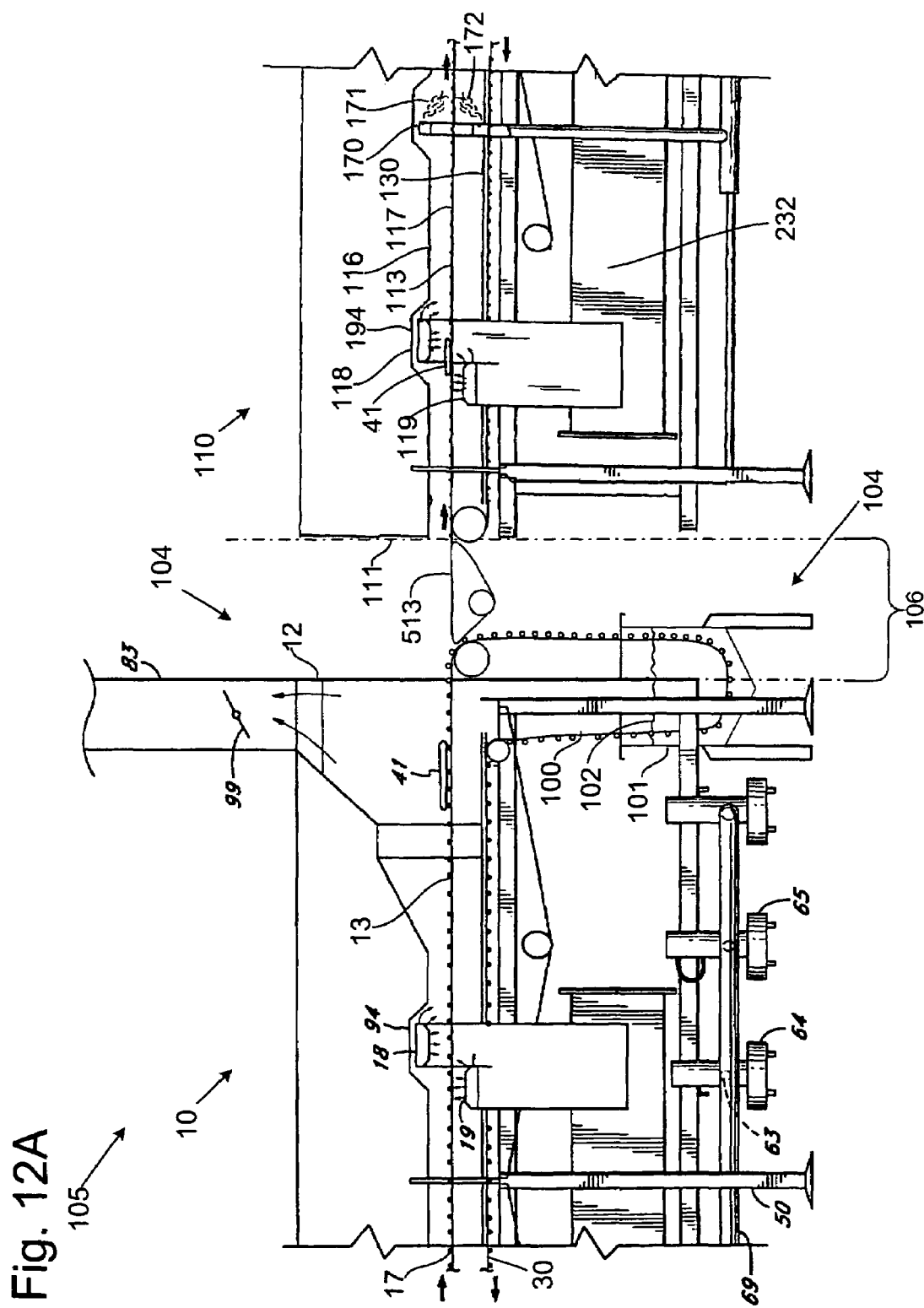

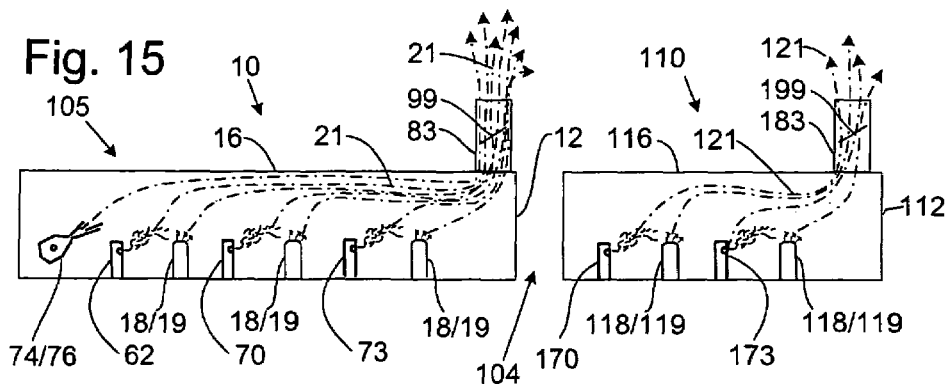
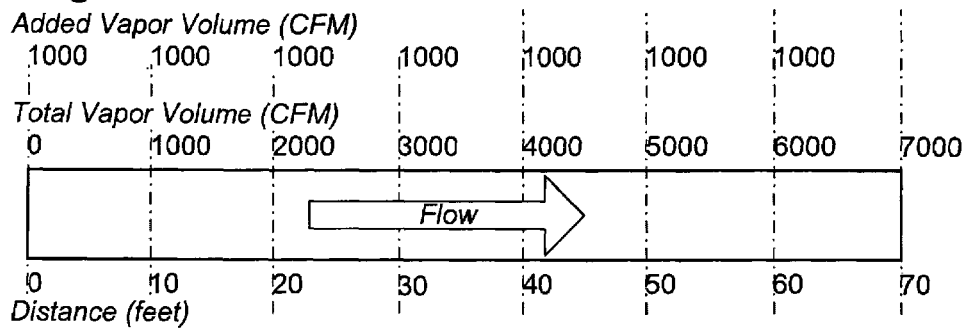
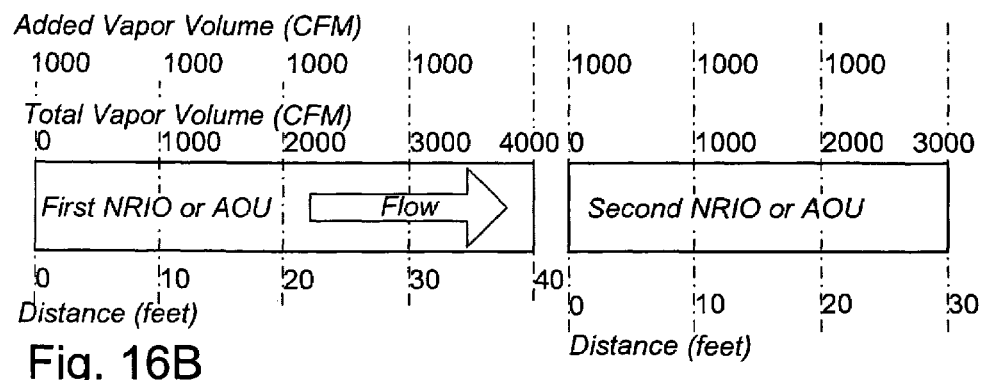

Fig. 17A "Prior Art"
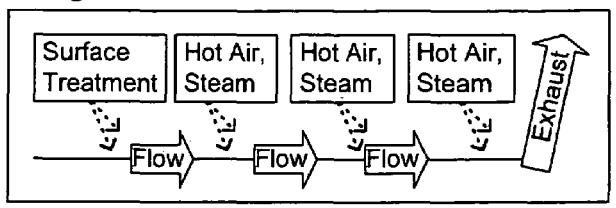
Fig. 17B
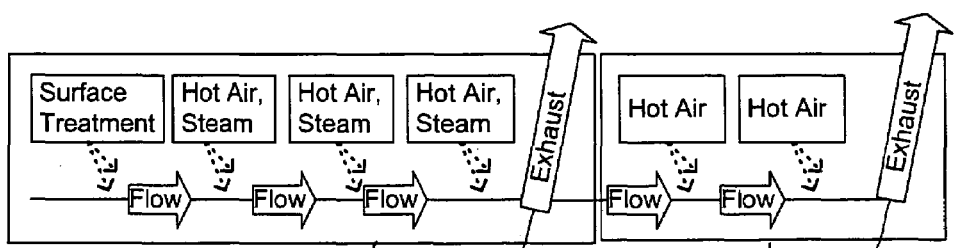
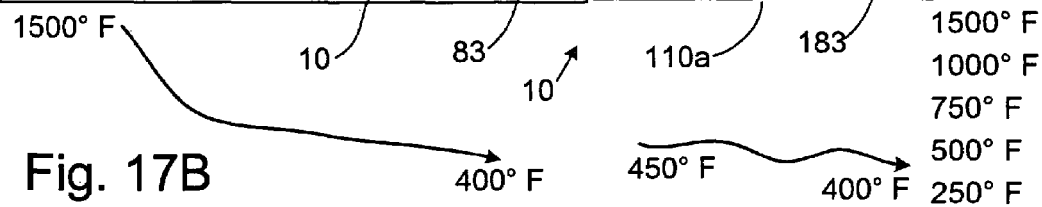
Fig. 17C
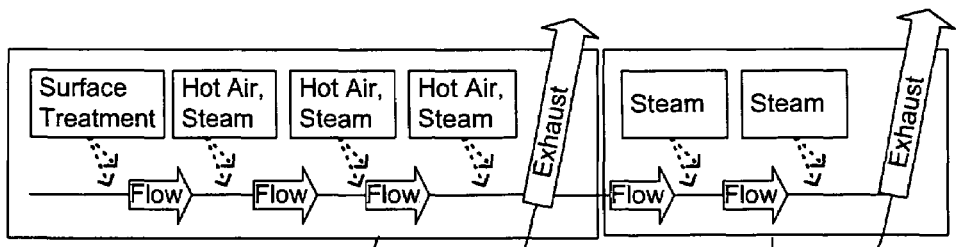
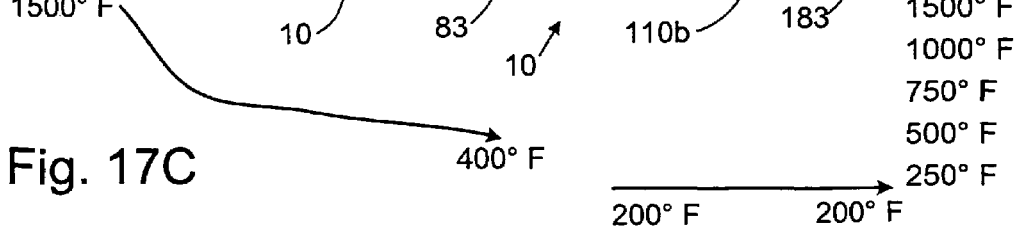

MODULAR COOKING OVEN AND RELATED METHODS

RELATED APPLICATIONS

This application claims priority from U.S. Provisional Application Ser. No. 60/647,690, filed Jan. 26, 2005, titled "Modular Cooking Oven and Related Methods," the contents of which are hereby incorporated by reference as if recited in full herein for all purposes.

BACKGROUND OF THE INVENTION

The field of the invention is cooking ovens. More particularly, the invention relates to continuous-cooking ovens of the type used to commercially bake, broil, steam, or otherwise cook meats, baked goods, and other foods.

Many patents have been granted on continuous-cooking ovens. A known type of such ovens, a brander-heated oven, includes a branding unit, an elongate cooking chamber, a conveyor belt running through the chamber, and possibly steam nozzles. Brander-heated ovens aim heat from the branding unit into the product-feed end of the chamber, and this heat is the only cooking heat source for the entire oven system. The steam nozzles, if used, introduce steam into the chamber to provide humidity to the foodstuff to help achieve a higher yield. System heat is not recirculated but is instead vented at the product-discharge end of the oven. Because such ovens rely on a front-end brander as the sole heat source, such ovens experience great difficulty regulating temperature. Also, such ovens are single-unit ovens.

Another known type of continuous-cooking oven uses one or more burners, directed into the cooking chamber from the feed end, as the sole heat source. The general configuration and operation of such ovens is similar to that of a brander-heated oven, substituting the burners for the brander. Such ovens cook by direct flame, radiant heat, and hot air from the flame. Such ovens do not propel heated air through a blower into the oven chamber via nozzles directed at the food, referred to as hot-air impingement. Also, such ovens are single-unit ovens.

Another known type of oven cooks by hot-air impingement combined with a provision to recirculate vapors. Such ovens typically collect vapors at the discharge end, direct the vapors through a blower and burner, and then reintroduce the reheated vapors to the cooking chamber at the feed end or thereabouts. (While the mass of air in the oven is largely recirculated, incidental venting of some vapors may occur at the feed and discharge ends.) Such ovens may be either single units or multiple units arranged in series. Such oven assemblies are not believed to have included a front-end brander or burner as an integral part of the oven assembly. Smoke and other flavor-enriching vapors consequently do not travel the length of the cooking chamber of any oven unit to impart flavor by prolonged contact with the food.

Another known type of oven cooks by hot-air impingement in combination with feed-end burners, branders, or both, without recirculation of vapors. This type of oven was disclosed U.S. Pat. No. 5,786,566, titled "Convection/Impingement Oven For Continuously Cooking Food," the disclosure of which is hereby incorporated by reference in its entirety.

The general features of the type of oven disclosed in the '566 patent comprise an enclosed, elongated cooking chamber, a moving belt to support the food product and carry it through the chamber, and a series of hot-air impingement units located along the length of the chamber above and below the belt. Typically, a surface-treatment section at the feed end has upper and lower burners that apply direct flame to the food product, thereby heating it, sealing it, searing it, browning it, and generally creating a desirable flavor and appearance. A rotating brander heated by the burners may apply appealing grill marks to the upper surface of the food (and the belt may apply similar marks to its lower surface). A series of steam nozzles may be located along the length of the chamber to supply water or steam to control humidity within the chamber, reduce product shrinkage, and supply moist heat for cooking.

In contrast to prior-art recirculating ovens that reuse oven air, the oven system of the '566 patent does not reuse cooking vapors. Instead, vapors pass the entire length of the chamber before being exhausted through a vent at the discharge end. Unlike recirculating ovens, ovens of the type discussed rely on an external air source to supply the air to be heated and blown through the impingement units to cook the food.

Continuous-cooking ovens of the type disclosed in the '566 patent offer very good throughput and very good control over cooking parameters such as temperature, moisture, and belt speed. Such ovens cook food by any combination of five methods—direct flame from the burners, surface cooking from the brander and belt, hot air from the impingement units, steam from the injectors, and convection from the lengthwise airflow—making them versatile. Such ovens may offer independent control above, below, and along the belt for flame, grill marking, hot air impingement, and steam injection, allowing distinct treatments for the upper and lower food surfaces. For example, the surface-treatment section typically has distinct, separately adjustable burners above and below the belt, so that flame intensity and burner angle may be controlled separately for each food surface. For another example, the upper and lower impingement units typically have separately controllable nozzles, so that hot air blown from above the food may differ in air pressure from that blown from below.

An installed oven is often part of a larger food-processing operation in which a stream of food product flows through the oven on the way to packaging and shipping. The throughput capacity of an oven is one of its most important practical properties. Capacity governs how an oven fits in with adjacent equipment and influences the throughput of the entire food-processing operation. The economics of commercial cooking often favor large-scale operations, creating an ever-present demand for higher capacity ovens to support higher production rates. The requirements of the food product usually constrain cooking time and temperature, so increasing the capacity of an oven usually dictates increasing its length. For example, suppose a chicken requires one square foot of belt space and one hour to cook. An oven with a three-foot by ten-foot belt cooks thirty chickens per hour, while an oven with a three-foot by twenty-foot belt cooks sixty chickens per hour. For continuous-belt ovens, such as the continuous-belt oven generally disclosed in the '566 patent, a higher-capacity oven is generally a longer oven.

As oven systems such as that generally disclosed in the '566 patent get longer, however, airflow within the oven can become problematic. The surface-treatment burners, impingement units, and steam nozzles constantly add hot air and steam to the cooking chamber. To maintain temperature through the length of the chamber, a longer chamber requires a larger volume of hot air, steam, or both. A longer chamber therefore has a larger volume of vapor, smoke, steam, and hot air to be exhausted at the discharge end. As the oven becomes longer, it becomes more difficult to pull air from the feed end to the discharge end. This difficulty becomes more pronounced in ovens longer than about 45 feet. A test of a 70-foot oven, for example, developing an exhaust of about 7,000 cubic feet per minute (CFM), actually lifted meat patties off the belt, through the exhaust ducting, and onto the factory roof. As this extreme example makes clear, airflow sometimes imposes a limitation on oven length and capacity.

A second issue, affecting ovens of any length, is the control of cooking parameters such as temperature along the length of the oven. Ovens of the type disclosed in the '566 patent generally have a temperature gradient running the length of the oven rather than a single fixed temperature over the entire length. At the feed end, near the surface-treatment burners, the oven may attain more than 1,500° Fahrenheit. At 45 feet, despite the ongoing addition of hot air and steam, the temperature may have fallen to about 400° F.; and at 70 feet, to about 200° F. This temperature gradient is partly the result of the airflow and exhaust issue just mentioned, since increasing temperature toward the discharge end requires increasing the amount of hot air and steam added along the chamber and exhausted at its end.

One result of the temperature gradient is restricted throughput capacity, since low temperatures toward the discharge end may force a slower conveyor rate (belt speed). Another result is reduced product yield, since a longer cooking time within the oven may increase the amount of fat, water, and other juices rendered from the food and therefore may reduce its cooked weight.

Yet another result is reduced control and versatility. High-heat transitioning to low-heat is an excellent cooking profile for many food products. That said, ovens of the type discussed have not permitted independent zonal control over temperature and other cooking parameters. Because the oven has a single, continuous cooking chamber, conditions in one region affect those of adjacent regions. Increasing the output of the surface-treatment burners to increase browning, for example, increases temperature at the feed end—but also increases subsequent temperatures, since heat from the burners travels the length of the oven. The continuous chamber limits the ability to control regions of the oven independently.

What is needed is a continuous-cooking convection/impingement oven that is scalable to higher-capacity and higher yield configurations and that offers zonal control over temperature and other cooking parameters. Ideally, the oven would be extensible to almost any length and capacity. Ideally, it would allow true, independent control over cooking conditions in a series of distinct regions arranged along the length of the oven, allowing exact tuning of processing conditions down the length of the belt.

SUMMARY OF THE INVENTION

In certain aspects, the present invention is a modular convection/impingement oven assembly for continuously cooking food. The oven assembly comprises at least one non-recirculating impingement oven (NRIO) unit and at least one additional oven unit (AOU). An NRIO is a continuous-conveyor, non-recirculating impingement oven unit. An NRIO comprises an elongated cooking chamber, a conveyor system such as a conveyor belt to carry food, a series of hot-air impingement units above and/or below the belt to heat the food, and a cooking vapor vent disposed at about the product-discharge end, as generally disclosed in the '566 patent. Preferably, an NRIO has a surface-treatment section comprising at least one burner, at least one brander, or both. Surface-treatment burners, if present, apply flame to the food product to produce desirable color effects (browning) and flavor effects (locking in natural juices, generating smoke flavors, and so on). Surface-treatment branders, if present, apply grill marks to the upper surface of the food, the lower surface of the food, or both. The belt may apply similar marks to the lower surface of the food. An NRIO may further comprise an independently controllable steam-delivery system to introduce moisture and heat during cooking.

Cooking vapors, including smoke and other flavor components, pass substantially the entire length of an NRIO before being exhausted through a cooking vapor vent at its discharge end or thereabout. Because the primary cooking vapors are not recirculated, air for the heaters and blowers that supply the impingement units is drawn from a source outside the oven. An NRIO may be built from subsystems according to the '566 patent, so a modular oven assembly according to the present invention preserves the flavor-development capabilities of a single-chamber oven, such as, those associated with smoke and vapors generated by the surface-treatment burners and flavoring the food by contact over the length of the oven.

An AOU is an additional, independent cooking or processing unit "upstream" or "downstream" from an NRIO and operatively coupled to it to provide continuous food-processing conditions or a transition from one set of conditions to another set of conditions. The oven assembly may comprise an NRIO followed by any number of AOUs arranged in series. In an embodiment, an AOU is an oven of the general type disclosed in the '566 patent. In certain embodiments, an AOU is an impingement oven, a steam oven, or a combined impingement-steam oven. In other embodiments, an AOU is a piece of oven-related equipment adapted to modify the flavor or appearance of the food product. In installations with multiple AOUs, each AOU may differ in purpose and function.

For simplicity and clarity, the present invention is usually described herein as a series of two or more oven units with an NRIO located in the first position, so that the discharge end of the NRIO abuts the feed end of the adjacent AOU. An NRIO may appear elsewhere in a series of oven units, however. For example, an NRIO may occupy the last position, with one or more AOUs upstream from the NRIO and none downstream. Similarly, an NRIO may occupy an intermediate position in the series, with at least one AOU preceding the NRIO and at least one following the NRIO. And an oven assembly may include multiple NRIOs.

In certain embodiments, each NRIO and AOU exhausts cooking vapors separately. Providing separate exhaust vents keeps exhaust volume from each oven unit within levels (typically, below about 4,000 CFM) known to be practical for a wide range of food products. Problems caused by excessive airflow, sometimes found to occur on conventional ovens longer than about 45 feet, therefore no longer limit the length of the oven assembly. An NRIO or AOU may be followed by an AOU or NRIO, which may be followed by another AOU or NRIO, and so on, to create a series of indefinite length. The modular oven assembly according to the present invention beneficially may have a higher intrinsic capacity than previous non-modular ovens. And the capacity of a given oven assembly may be changed at any time, even after the original installation, by adding or deleting oven units.

To assure proper air flow, in certain embodiments, an oven assembly according to the present invention provides an air gap between each adjacent oven unit, effectively decoupling air flow between oven units.

Modular construction with a separate surface-treatment section (if present), hot-air-impingement system (if present), and steam-delivery system (if present) for each oven unit creates an independent control over cooking parameters such as temperature and over cooking methods such as hot-air impingement for each oven unit. For example, an NRIO has its own burner and blower to supply its impingement units. Adjusting its impingement system (and its surface-treatment and steam-delivery systems, if present) yields tight control over cooking within the NRIO. Each AOU preferably has its own, separately controlled flame, hot air, and steam systems, in any combination, thereby yielding tight control over cooking parameters and methods in each AOU. A beneficial result of a modular oven assembly is true zonal control along the length of the assembly. Each oven unit is a distinct cooking region, separately adjustable from neighboring oven units.

As noted in the Background section, conventional, single-chamber, non-recirculating ovens have a temperature gradient running the length of the oven. For example, a single-chamber oven might attain about 1,500° F. at the feed end and fall to about 200° F. at the discharge end. An oven assembly according to the present invention can achieve temperature profiles that differ from this falling gradient. Each NRIO or AOU preferably has independent heat sources (flame, hot air, or steam, in any combination). Each NRIO or AOU therefore may maintain higher or lower temperatures than those easily attained at the same "distance" inside a conventional oven. For example, a single-chamber oven might be 300° F. at about 30 feet from the feed end. An oven assembly with an AOU starting at about 30 feet might reheat to a higher temperature such as 500° F.

Maintaining a generally higher temperature over the entire oven length may improve the capacity of the oven assembly by reducing cooking time. Faster processing in turn may improve yield by reducing the amount of fat, water, and other juices rendered from food during cooking, thereby reducing shrinkage and increasing cooked weight. The new ability to create non-gradient temperature profiles also improves versatility by allowing the oven assembly to cook a wider range of food products and achieve a wider range of cooking effects.

Another benefit of the present invention is the ability to control cooking methods independently along the length of the oven assembly. For example, the oven assembly may separate steam cooking from hot-air cooking. In a single-chamber oven, all hot air and steam introduced anywhere in the chamber ultimately travels the entire chamber length. In an oven assembly with separate cooking vapor vents according to the present invention, hot air and steam introduced into an NRIO, for example, are exhausted at its discharge end and do not affect the adjacent AOU, for example. The AOU therefore may employ only hot air, only steam, or any combination of hot air and steam, independent from its neighbors. This beneficial aspect of the present invention further improves the versatility of the oven assembly. Furthermore, pure-steam cooking is often faster than hot-air cooking because steam cooking drives steam through the food while hot air heats only the food surface. The option for pure-steam cooking in one or more AOUs represents yet another gain in yield, capacity, or both.

Many NRIO subsystems (and those of some AOU embodiments) may be analogous to those disclosed for single-chamber ovens by the '566 patent. For example, within an NRIO, the general construction and arrangement of the surface-treatment burners (if present), surface-treatment brander (if present), hot-air impingement units, and steam nozzles (if present) may be comparable to that of the '566 patent.

A difference involves the conveyor system, which is typically a pervious, continuous, moving belt that has an upper product-supporting surface called a "food-supporting belt" and a return belt portion. In an embodiment, a common belt passes through an NRIO or AOU and at least one adjacent oven unit. In another embodiment, an oven unit has a separate belt not shared with an adjacent oven unit. Oven assemblies with multiple oven units may employ both approaches, with some adjacent oven units having a common belt and others having a separate belt.

For embodiments with separate belts, the belt of a given oven unit may run at different rate from that of a neighboring oven unit. For example, shrinkage of food during cooking may permit a later belt to run at a slower conveyor rate, beneficially tightening the spacing of food items on the belt, thereby further increasing the capacity of the oven assembly.

A second difference involves exhaust venting. Ovens according to the '566 patent have a cooking vapor vent having an inlet positioned adjacent the discharge end of the cooking chamber, and that vent comprises the only outlet for cooking vapors. Ovens according to the present invention instead have a cooking vapor vent for each oven unit. In some embodiments, a portion of the exhaust or cooking vapors is ducted from one oven unit into the next oven unit to pass flavor components, heat, or both from one oven unit to the next The foregoing is not intended to be an exhaustive list of embodiments and features of the present invention. Persons skilled in the art are capable of appreciating other embodiments and features from the following detailed description in conjunction with the drawings.

BRIEF DESCRIPTION OF THE DRAWINGS

FIGS. 1 through 17 show representative embodiments according to the principles of the present invention, wherein similar features share common reference numerals. Where a non-recirculating impingement oven (NRIO) and an additional oven unit (AOU) have analogous features, the reference numerals for the AOU typically are offset from those of the NRIO by adding one hundred or multiples of one hundred.

FIG. 1A is a side view of a modular oven assembly of the present invention, omitting the hood-support structure;

FIG. 1B is a top view thereof;

FIG. 3 is a cross-sectional view taken along line 3—3 of FIG. 2B, but additionally showing a belt-cleaning loop and tank;

FIG. 4A is an enlarged cross-sectional view of the feed end of the NRIO of FIG. 3 including the surface-treatment section, a steam nozzle assembly, and a hot-air impingement assembly;

FIG. 4B is an enlarged view taken along line 4B of FIG. 4A;

FIG. 5 is a cross-sectional view taken along line 5—5 of FIG. 4A;

FIG. 6 is an enlarged cross-sectional view of the discharge end of the NRIO of FIG. 3;

FIG. 7 is a cross-sectional end view showing the oven assembly of FIG. 1 with the hood thereof raised.

FIG. 12A shows a detail view of a transition from an NRIO to an AOU, each having a separate conveyor system, such as that shown in FIG. 11A, and also showing a transfer conveyor belt and a space-efficient placement for a belt-cleaning loop and tank;

FIG. 15 shows a side view of an oven assembly having an NRIO having one exhaust for its cooking vapors and an AOU having a separate exhaust for its cooking vapors;

FIG. 16A shows representative temperature and airflow values at various distances along the length of a prior-art oven;

FIG. 16B shows representative temperature and airflow values at various distances along the length of an oven assembly according to the present invention;

FIG. 17A shows the single cooking zone of a prior-art oven, including representative temperature and airflow values;

FIG. 17B shows the multiple cooking zones of a modular oven assembly according to the present invention, in this case comprising an NRIO followed by an impingement-only AOU, including representative temperature and airflow values; and FIG. 17C shows multiple cooking zones in a modular oven assembly according to the present invention, in this case comprising an NRIO followed by a steam-only AOU, including representative temperature and airflow values.

DETAILED DESCRIPTION OF THE INVENTION

Modular Oven Assembly

Figure 2A:
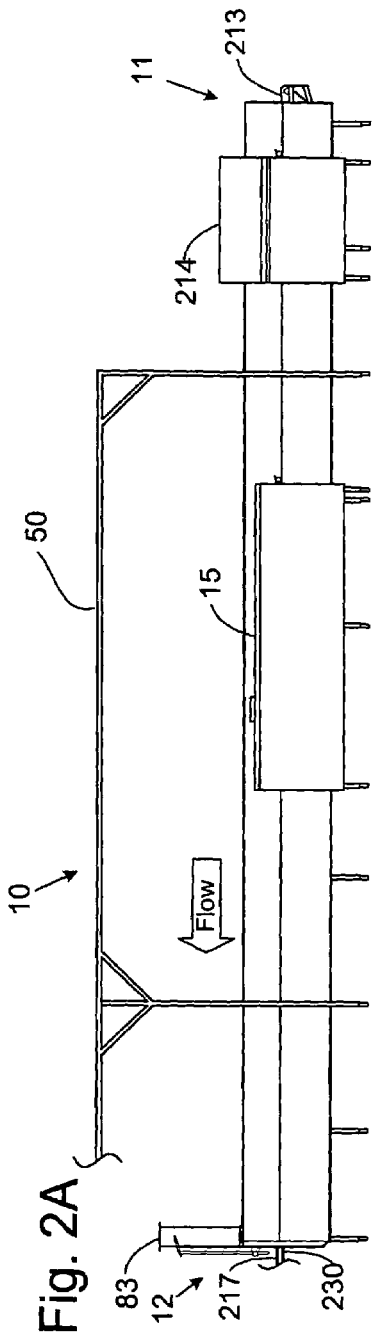
FIG. 2A is a side view of the NRIO of FIG. 1.
Figure 2B:
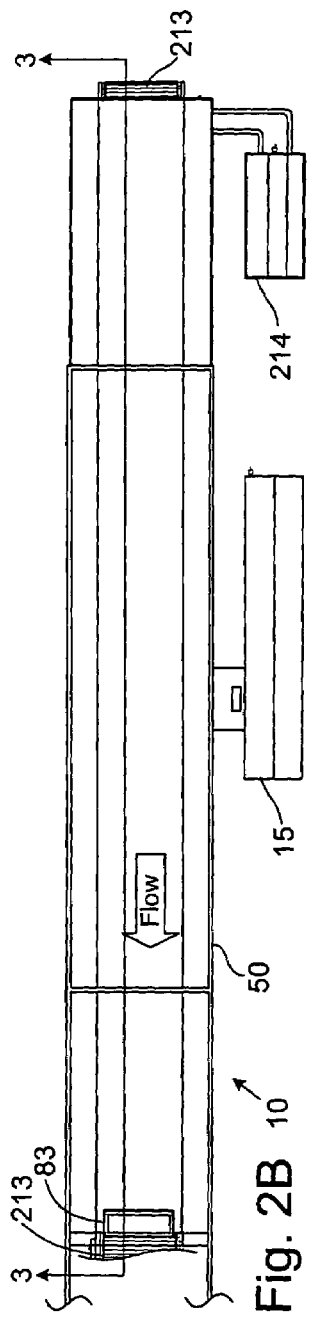
FIG. 2B is a top-view thereof.
Figure 2D:
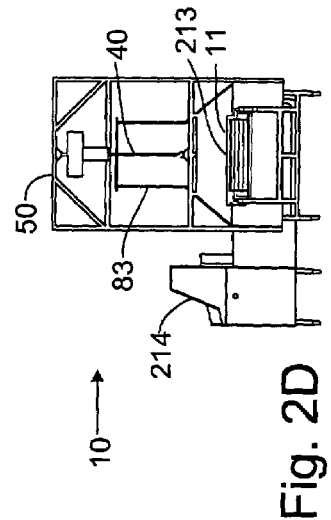
FIG. 2D is a feed-end view thereof.
Figure 2C:
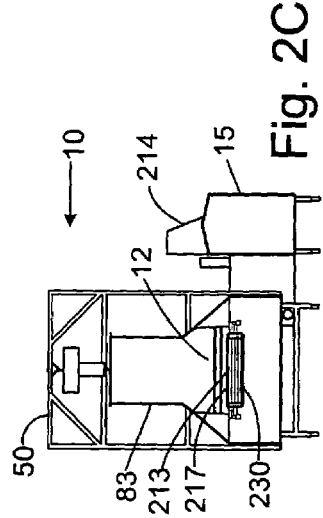
FIG. 2C is a discharge-end view thereof.

Referring to FIGS. 1A through 9D, a modular oven assembly 105 according to the present invention comprises at least one non-recirculating impingement oven (NRIO) 10 and at least one additional oven unit (AOU) 110 arranged in series to provide for continuous cooking and processing of food items. NRIO 10 has a product-feed end 11 and a product-discharge end 12 with a cooking vapor vent 83 at or near discharge end 12. AOU 110 similarly has a product-feed end 111 and a product-discharge end 112 with a cooking vapor vent 183 (if present) at or near discharge end 112. Typically, but not necessarily, NRIO 10 abuts AOU 110 so that its discharge end 12 abuts feed end 111 of the adjacent AOU 110. Preferably, an air gap 104 between discharge end 12 and feed end 111 may separate NRIO 10 from AOU 110. Gap 104 advantageously decouples air flow between adjacent oven units as detailed below. An "oven unit" herein refers generally to either an NRIO or an AOU, typically in contexts that may apply to either type of unit.

In the embodiment of FIGS. 1A and 1B, oven assembly 105 comprises a single NRIO 10 followed by a single AOU 110. Oven assembly 105 may comprise multiple NRIOs, multiple AOUs, or both, in any sequence, joined in series. For example, oven assembly 105 may comprise an NRIO 10, followed by an AOU 110a, followed in turn by another AOU 110b, and so on. Oven assembly 105 is indefinitely extensible to practically any desired length, capacity, and number of cooking zones.

For simplicity and clarity, the present invention is often described herein as an oven assembly with one NRIO 10 in the first position at the feed end of oven assembly 105. Other arrangements are within the scope of the present invention. For example, NRIO 10 (an impingement oven generally according the '566 patent) may occupy the terminal or discharge position in an oven assembly 105 that is constructed with one or more AOUs 110 "upstream" from NRIO 10. Similarly, NRIO 10 may occupy an intermediate position within oven assembly 105 that is configured with at least one AOU 110 preceding NRIO 10 and at least one AOU 110 following NRIO 10. Furthermore, oven assembly 105 may employ more than one NRIO 10, where each NRIO 10 is an oven unit generally according the '566 patent, placed in any position of the oven assembly. As these generalized sequences make clear, the modular principles of the present invention permit assembly NRIO and AOU modules in any order, according to the requirements of the food to be cooked.

Non-Recirculating Impingement Oven Unit

Referring especially to FIGS. 2A through 8A, NRIO 10 generally comprises an elongated cooking chamber 16 with feed end 11 and discharge end 12, a conveyor system such as a belt 13 to carry food items 41, a series of upper impingement units 18 and/or lower impingement units 19 to heat food items 41, and a cooking vapor vent 83 at or near discharge end 12. NRIO 10 is a non-recirculating oven that draws air for its impingement units 18, 19 from outside the oven. Depending on the kind of food being cooked, NRIO 10 may include a surface-treatment section near its feed end for creating a desired surface effect on the surfaces of food items 41.

Surface-Treatment Section

The surface-treatment section (which also may be called a "color development and sealing section") applies direct flame, grill marks, or both to the food product in order to produce desirable color effects (such as browning) and desirable flavor effects (such as locking in natural juices). The surface-treatment section comprises at least one burner and/or at least one brander. Surface-treatment burners and a brander typically are present in NRIO 10 and absent from AOU 110. However, any NRIO 10 or AOU 110 may include or exclude surface-treatment burners, branders, or both. An NRIO 10 or AOU 110 with a surface-treatment section is, in effect, a "flavor oven unit," since broiling, searing, and contact with smoke and other flavor-bearing vapors all strongly contribute to the appeal of the cooked food product.

As best seen in FIG. 4A, a typical surface-treatment section has adjustable burners 74, 76 above and below conveyor belt 16. An associated brander 78 may be used to apply grill marks to the upper and/or lower surface of the food and to provide hot surfaces for direct-contact surface cooking. Among the advantages of including burners 74, 76 and/or brander 78 are that cooking vapors, including smoke, hot air, steam, and other surface-treatment products, travel the length of the oven unit 10 (or 110), thereby enhancing product flavor and appearance. The duration of contact between the food and the vapors—which is a function of oven length and conveyor rate—is an important parameter controlling the extraction of flavor from the vapors. As mentioned, the smoke, vapor, and so on are exhausted via vent 83 (or 183) at discharge end 12 (or 112) or thereabouts.

Referring to FIG. 4A, which shows an exemplary NRIO 10, an upper surface-treatment burner 74 is fed with high-pressure air and gas to produce a flame 75 that heats the upper surface of food items 41. Flame 75 provides coloring and sealing to food items 41. Similarly, a lower surface-treatment burner 76 produces a flame 77 that heats the lower surface of food items 41. Heat from flames 75 and 77 may heat an upper-surface brander 78, which is driven by chain-link belt 79 driven by gear 80, which also contacts the continuous moving belt 13. Brander 78 may occupy a fixed position or float so that it will rise and fall over irregular food surfaces if necessary. Brander 78 may also be permanently raised to eliminate any branding. Branding rods 81 always move at the same speed as food-supporting belt 17 to provide a neat brand on the upper surface of food items 41. The lower side of the food items 41 is branded by moving belt 13, but belt 13 may be cooled to eliminate lower-surface branding if desired. The phrase "surface of the food" and its variations may refer to the upper and/or lower surfaces of the food. For example, "at least one surface of the food" indicates the upper surface of the food, the lower surface of the food, or both.

A lower-surface brander is substantially similar to the upper-surface brander 78 of FIG. 4A, except that a lower-surface brander is situated beneath food-supporting belt 17 (or 217) and is adapted to mark the lower surface of the food. For example, a lower-surface brander may be a cylindrical device with stainless-steel branding rods that connect the perimeters of the two circular bases, so that the rods form the barrel of a drum (a "squirrel cage"). Typically, the rods are regularly spaced with a gap between each pair. Typically, the brander is rotated by a chain-link belt like that previously described. Typically, the branding rods of a lower-surface brander rotate through flame 77, which heats the rods prior to contact with the food. Belt 17/217 in turn may comprise food-supporting rods aligned widthwise across the belt, yielding a widthwise gap between each pair of food-supporting rods. The branding rods may be spaced along the brander drum so that the branding rods fit in between the widthwise gaps of belt 17/217. Because the rotational speed of the brander drum derives from that of belt 17/217, the branding rods can touch the lower surface of the food without interfering with belt 17/217. The food thereby has a larger number of marks, or a different pattern of marks, than it would have if the food-supporting rods were the sole source of lower-surface marks.

Burners 74 and 76 may be aimed through a 90-degree arc at any angle from horizontal pointed into cooking chamber 16 to vertical pointed toward moving belt 17. Upper burner 74 thus may pivot from horizontal to directly downward, and lower burner 76 may pivot from horizontal to directly upward. The choice of direction depends on the amount of coloring and sealing desired and on the type of food being cooked. Flames 75 and/or 77 may be aimed to directly impinge the surfaces of the food items 41, or they may merely heat the surfaces, depending on how burners 74 and 76 are aimed. Steam from steam nozzle assembly 62, immediately "downstream" from burners 74 and 76, quenches any flare-up from the burners 74, 76 and also reduces excess heat if desired.

Certain advantages may be achieved by aiming flames 75 and 77 toward the opening of cooking chamber 16. For example, by conveying heat, smoke, vapor, and other surface-treatment products from flames 75 and 77 into cooking chamber 16, flames 75 and 77 add heat to chamber 16 and impart flavor from the surface-treatment operation to the food items 41 traveling down belt 17.

Hot-Air Impingement System

The hot-air impingement system blows hot air on food items 41 to provide substantially dry heat to cook food items 41. "Hot air" herein includes any heated gas or blend of gasses, normally but not necessarily atmospheric air. In certain embodiments, as shown in FIG. 8B, the impingement system for NRIO 10 (and for some embodiments of AOU 110) may be generally similar to that of the '566 patent, which discloses separate upper and lower burners 22 and 22', blowers 29 and 29', manifolds 32 and 34, and temperature control for the lower and upper hot-air impingement units 18 and 19. An NRIO 10 or AOU 110 thus may provide a hot-air impingement system with independent upper and lower hot-air sources, delivery systems, and temperature control.

In other embodiments, detailed herein and shown in FIGS. 4A, 6, 7, 8A, and 8C, an NRIO 10 or AOU 110 may have a single hot-air source and delivery system for both its upper and lower air-impingement units. This simplification eliminates the ability to apply different temperatures to the upper and lower surfaces of food items 41 but maintains the ability to separately regulate air pressure at each impingement unit.

Figure 8A:
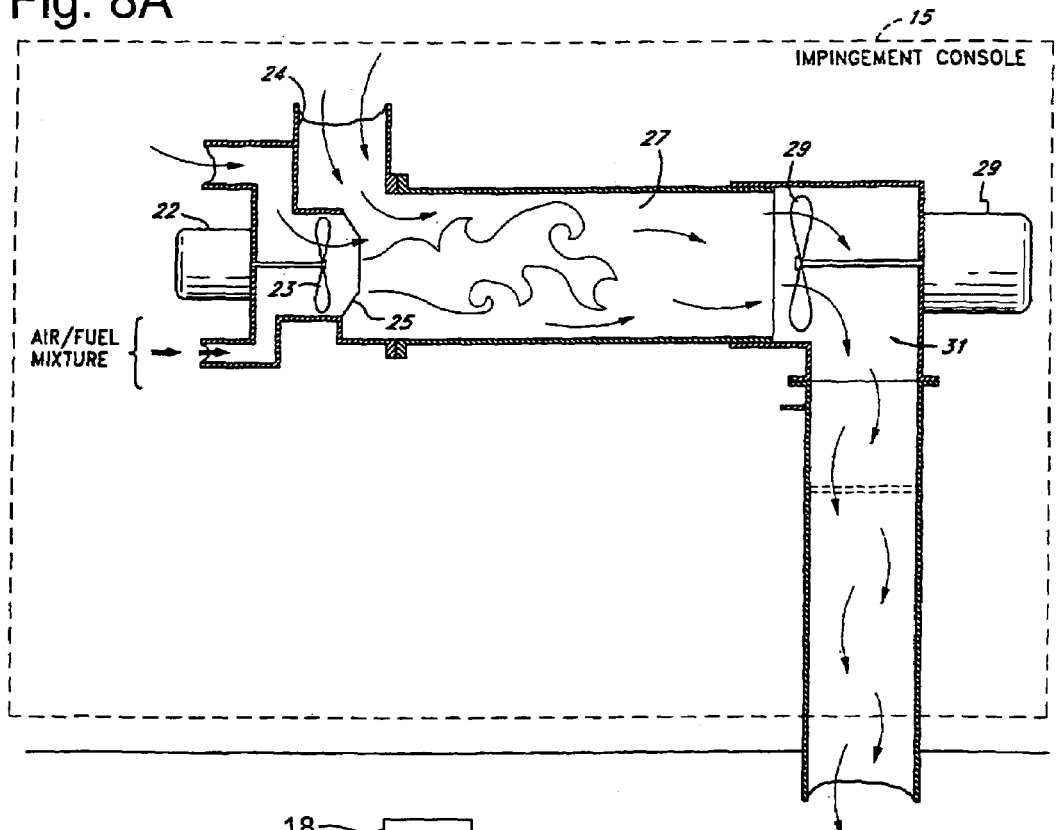
FIG. 8A shows a burner and blower assembly that supplies hot air for cooking.
Figure 8B:
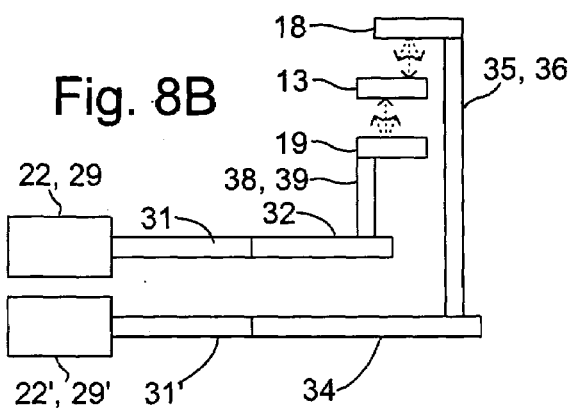
FIG. 8B shows a plan view of a hot-air impingement system that supplies the upper and lower impingement nozzles from independent hot-air sources.
Figure 8C:
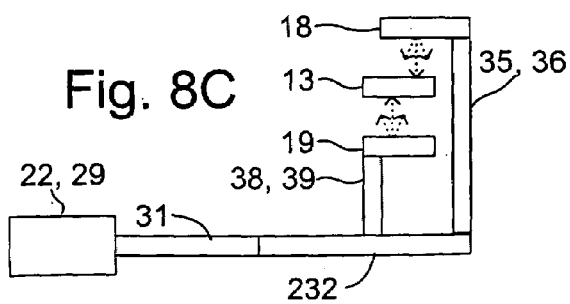
FIG. 8C shows a plan view of a hot-air impingement system that supplies the upper and lower impingement nozzles from a common hot-air source.
Figure 9A:
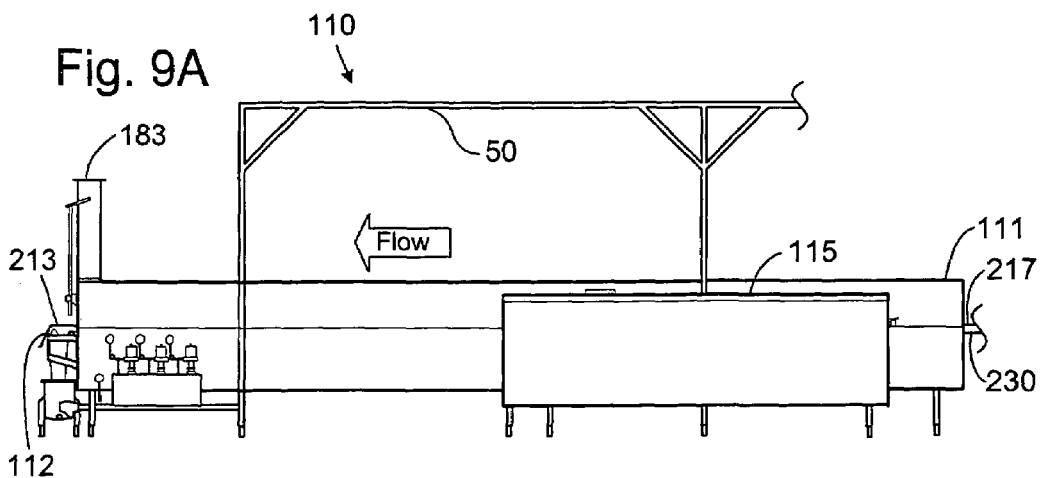
FIG. 9A is a side view of the AOU of FIG. 1A.
Figure 9B:
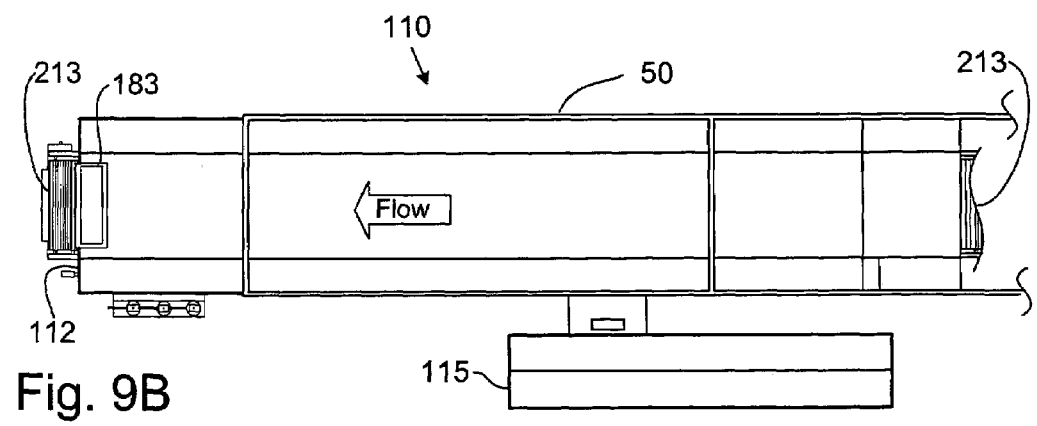
FIG. 9B is a top view thereof.
Figure 9C:
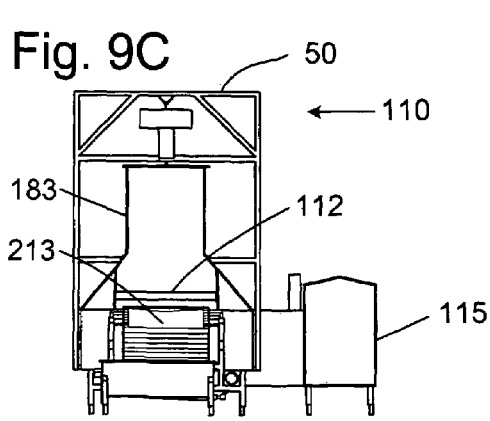
FIG. 9C is discharge-end view thereof.
Figure 9D:
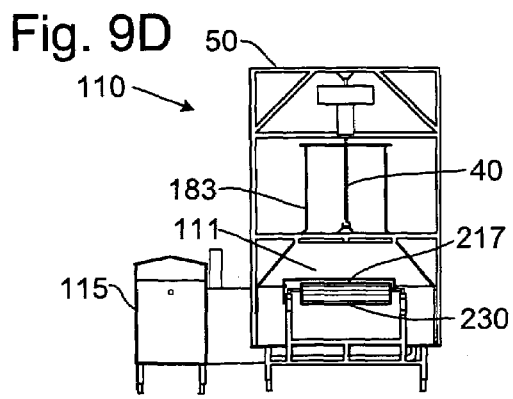
FIG. 9D is a feed-end view thereof.

Referring to FIG. 8A, burner assembly 22/23 feeds air and fuel to a burner nozzle 25, which burns a fuel such as natural gas from a fuel inlet (not shown) and forms a flame that heats the air in the interior of manifold 27. The interior of manifold 27 is at about atmospheric pressure and draws air as needed through conduit 24 which is open to the exterior of the oven. Conduit 24 does not need to draw any recirculated hot air from vent 83. The hot air at atmospheric pressure in manifold 27 is fed to a blower assembly 29 which increases its pressure. As blower assembly 29 requires more hot air, above that required to simply move the gasses exiting nozzle 25, it is supplied by the air stream entering conduit 24, so it does not have a negative feed-pressure. Blower assembly 29 feeds the hot air into a hot-air conduit 31 from which it passes into hot-air manifold 232. Both the burner assembly 22/23/25 and the blower assembly 29 may be independently controlled so that the temperature as well as the air pressure may be set to a preferred level for the product to be cooked.

Figure 6:
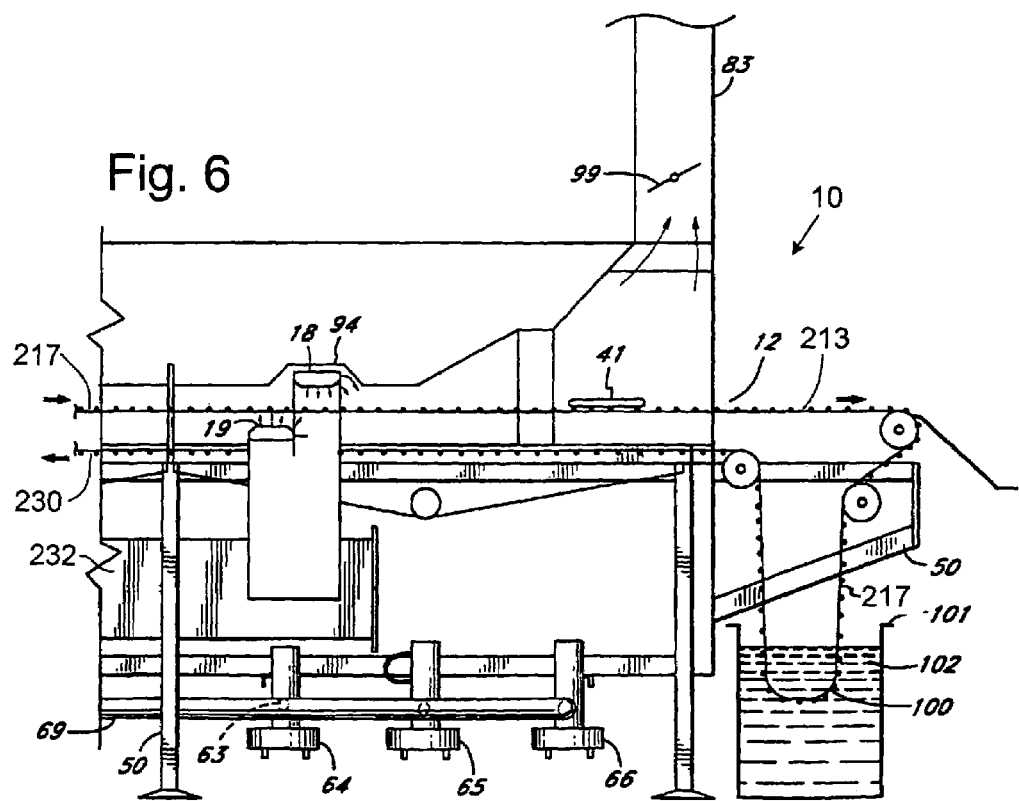
Figure 7:
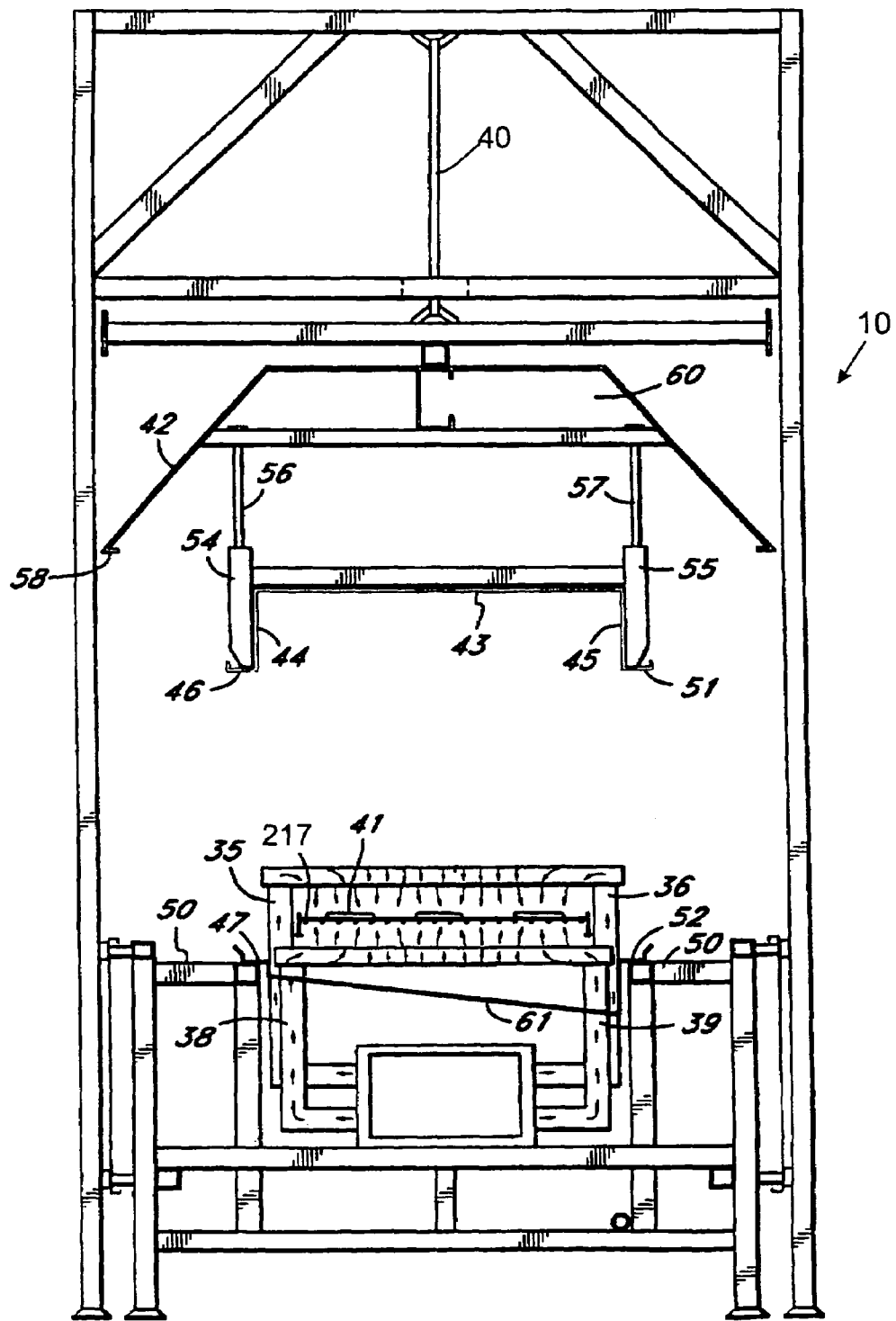

As best shown in FIGS. 4A, 6, and 7, hot-air manifold 232 feeds hot air into a lower air-impingement nozzle assembly 19 and upper air-impingement nozzle assembly 18, which in turn blow hot air into the oven chamber and onto the food items for cooking. In the embodiment of FIGS. 4A and 4B, air for the lower nozzles passes from manifold 232 through right and left hot-air channels 38 and 39 and into nozzle assembly 19. Air under a relatively low pressure then passes through upwardly directed holes 85 in the plates of the nozzle and impinges upon food items 41. Air also passes through holes 88 in an angled plate 87, which typically directs air forward toward vent 83 at the discharge end of the oven chamber 16. Air for the upper nozzles similarly passes from manifold 232 through channels 35 and 36 to nozzle assembly 18, which urges hot air downwardly through holes 90 and/or forwardly through holes 92 to impinge food items 41 and to help urge the gas flow down oven chamber 16 to vent 83.

The arrangement of holes and the direction of the hot air may differ from that described above. The nozzles in general may blow hot air in any direction within the oven. For example, an upper nozzle assembly may additionally or alternatively blow air upwardly (away from the food) or backwardly (toward the feed end of the oven).

This hot-air impingement not only heats food items 41 by convection but also tends to remove any stagnant air and vapor layer that surrounds and insulates the food items. Thus, food 41 is heated more efficiently and more quickly by the fact of the air impingement. It further carries with it the surrounding cooking vapor with its temperature and humidity so that food 41 is more quickly raised to the desired temperature. Since the food-supporting belt 17 is largely open, the hot air passes readily through it and around all sides of food 41. Some embodiments of AOU 110 may employ an air-impingement system similar to that described above.

Impingement Units

Upper impingement units 18 and lower impingement units 19 are in communication with blower 29 and direct pressurized hot air onto food 41 to provide convection heat for cooking. FIG. 4B shows the top of exemplary impingement units 18 and 19, where it can be seen that impingement unit 19 has a nozzle plate 84 with a plurality of small holes 85, which causes the hot air to move out in small discrete streams against food 41. In this embodiment, there are no nozzles on the angled face 86, but there are nozzles on the angled face 87, which are indicated by reference character 88. Similarly, upper impingement unit 18 has a nozzle plate 89, shown in FIG. 4A in side view, which also has a plurality of holes 90. An angled face 91 also has a plurality of holes 92, but angled face 93 has no holes. This arrangement causes the air to be urged generally toward the food and typically toward the discharge end to help move the cooking vapors 21 along the oven. The size, shape, angle, and location of nozzles are changeable to reflect the cooking requirements of a given food product. For example, an impingement unit above the food-supporting belt typically directs air generally downwardly toward the food, while an impingement unit below the belt directs air generally upwardly toward the food. The present invention is not intended to be limited to the specific impingement units shown in the drawings. As persons skilled in the art will appreciate, there are many other means for directing air from the blower directly onto food 41, and such means are within the scope of the invention.

As shown in FIGS. 4A and 4B, the upper wall 43 of cooking chamber 16 is angled upwardly as indicated by reference character 94 to accommodate impingement units 18 and 19 and steam nozzle assemblies 62/70/73. This arrangement minimizes the internal volume of cooking chamber 16 and helps to increase the velocity of cooking vapor 21 concurrently with the food-supporting belts 17.

Figure 3:
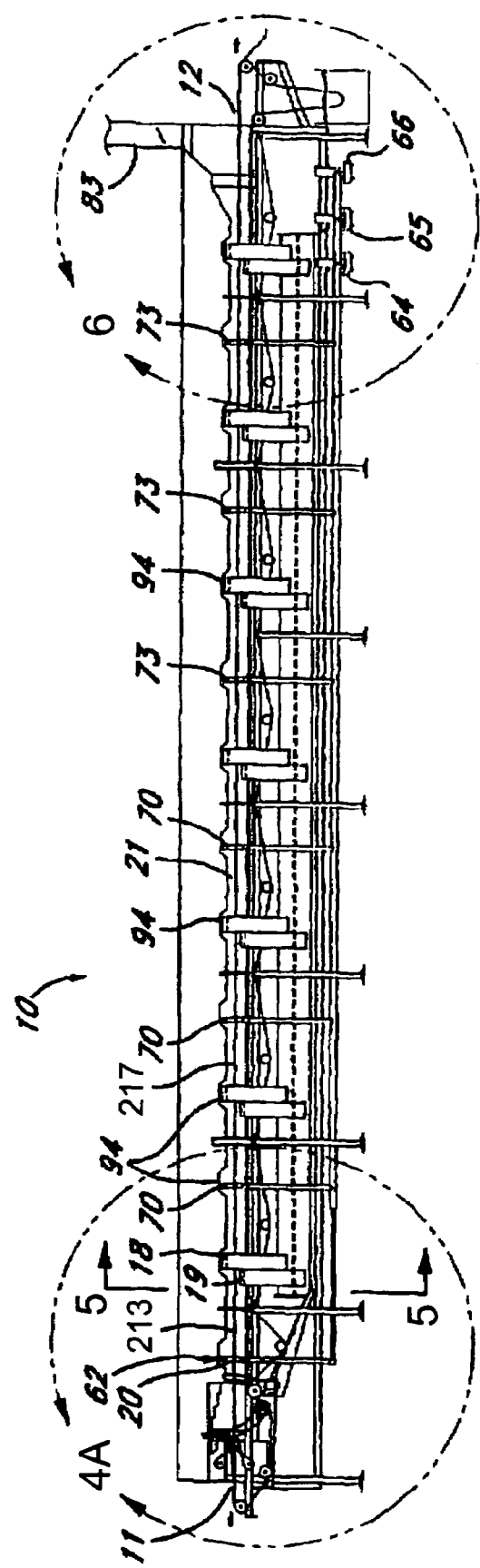

Also viewing FIG. 3, it is evident that the multiple entries of hot air and steam increase the volume of cooking vapors 21 along chamber 16. As a result, as food 41 becomes more cooked, cooking vapor 21 increases in velocity.

Some embodiments of AOU 110 may employ hot-air impingement units similar to those described above.

Steam Delivery System

The optional steam-delivery system introduces steam from a steam source such as a boiler into the cooking chamber to supply heat and humidity during cooking. It is, of course, understood that the term "steam" is intended to include gaseous steam, a spray of water mist which is quickly turned to steam in the high temperatures of the cooking chamber, or both.

In the embodiment of FIGS. 1 through 9, the steam-delivery system comprises steam nozzle assemblies 62/70/73 in gaseous communication with a steam source (not shown), for example, by way of steam valves 64/65/66 and steam lines 63/69. Nozzle assembly 62 injects an upper stream of steam 67 and a lower stream of steam 68 into chamber 16; and nozzle assemblies 70 inject streams 71 and 72; and likewise with nozzle assembly 73. Nozzle assemblies 62/70/73 are disposed along the length of chamber 16 and provided with separate steam valves 64/65/66, thereby permitting a degree of regional control along chamber 16. NRIO 10 preferably has a steam-delivery system generally similar to that disclosed in the '566 patent. Some embodiments of AOU 110 may include a steam-delivery system of this type or of other types known in the art.

Figure 5:
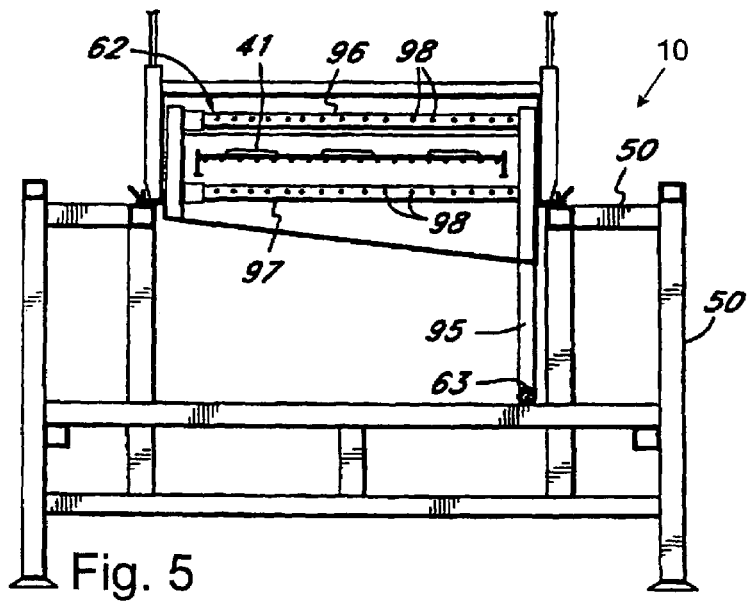

FIG. 3 shows an overview of the steam-delivery system, FIG. 4A shows a side view of a steam nozzle assemblies 62 and 70, FIG. 5 shows a front view of assembly 62, and FIG. 6 details steam lines 63/69 and valves 64/65/66. As shown, steam valve 64 regulates steam line 63 to supply steam to nozzle assembly 62 by way of vertical steam line 95, upper horizontal steam manifold 96, and lower horizontal steam manifold 97. Nozzle assembly 62 emits upper and lower streams of steam 67/68 through a plurality of individual nozzles 20, which urge the streams 67/68 through chamber 16 toward the discharge end 12 as shown in FIG. 4A. Directing streams 67/68 toward the discharge end 12 helps to move cooking vapor 21 in the same direction as food-supporting belt 17. For oven units 10, 110 that provide a high-temperature surface-treatment section, streams 67/68 placed after burners 74/76 tend to extinguish any flare-up that may occur. Streams 67/68 also controllably reduce excess heat from burners 74/76.

To provide the operator with additional temperature and moisture control, steam valve 65 independently regulates a separate steam line 69, which supplies one or more steam nozzle assemblies 70 placed at intervals along the length of chamber 16. Each nozzle assembly 70 produces upper and lower streams of steam 71 and 72, which are directed toward discharge end 12 to urge vapors 21 along belt 17 and toward vent 83.

To provide even more control, steam valve 66 may separately regulate one or more steam nozzle assemblies 73 disposed along belt 17 toward discharge end 12 as shown in FIG. 3. As previously described, each nozzle assembly 73 directs upper and lower streams of steam toward food 41. The multiple sets of valves, lines, and nozzles create a degree of control over moisture and temperature along a length of chamber 16 as food 41 cooks while traveling on belt 17.

In other embodiments of the steam-delivery system, steam nozzle assemblies may run lengthwise along chamber 16—instead of crosswise as shown in FIGS. 3, 4A, and 6. In such embodiments, the steam lines, manifolds, and valves may be adapted to create separately controllable zones, similar to those of FIG. 3, disposed along the length or width of chamber 16. Also, nozzle assemblies may be adapted to direct streams of steam at any angle, or at multiple angles. As depicted, streams 67/68/71/72 are generally directed toward belt 13 and discharge end 12. Alternative embodiments of nozzle assemblies may direct one or more streams of steam vertically upward or downward, horizontally inward or outward, or longitudinally forward or backward, or at any intermediate angle. Alternative embodiments of nozzle assemblies may emit streams of steam in more than one direction at a time, such as, forward plus upward, forward plus downward, or forward plus upward plus downward.

Some embodiments of AOU 110 may employ a steam-delivery system similar to that described above for NRIO 10.

Cooking Chamber and Hood

Cooking chamber 16 is an elongated enclosure that surrounds belt 13 to delimit the internal volume heated to cook food 41. Chamber 16 has a hood 42 to define the top wall and side walls of chamber 16. Hood 42 may be raised for cleaning or lowered for cooking. Chamber 16 is open at its feed end 11 and discharge end 12 to permit a conveyor system such as belt 13 to continuously transport food though chamber 16. Chamber 16 and hood 42 for NRIO 10—and for some embodiments of AOU 110—is generally similar to that disclosed in the '566 patent.

FIG. 7 shows the surfaces of the chamber 16 with hood 42 in the raised position. Chamber 16 comprises upper wall 43, left-side wall 44, and right-side wall 45. The base portions 46 and 51 rest in the sealing lips 47 and 52 of the lower pan 61 when hood 42 is lowered. Hood 42 comprising walls 43, 44 and 45 is held on a cross-member 53, which is, in turn, held by two vertical members 54 and 55. Members 54 and 55 are supported by rods 56 and 57. Hood 42 is raised and lowered by a chain hoist 40 supported by frame 50. Rods 56 and 57 telescope into vertical members 54 and 55 so that as hood 42 is lowered, the base 58 thereof rests upon the frame to create a dead air space 60 above the upper surface and the side walls of the chamber 16. Lower pan 61 of chamber 16 provides a conventional slanted floor for removing grease or other liquid.

It is desirable to keep the air volume of chamber 16 relatively small, in order to minimize the volume of air to be heated for cooking, thereby minimizing fuel cost, and in order to minimize the outer surface area of chamber 16, thereby minimizing radiation heat loss. Outer sides are, of course, provided along the entire length of the oven to further reduce heat loss.

Additional Oven Unit

An AOU 110 is an additional cooking or processing unit upstream or downstream from NRIO 10, within which processing conditions may be independently controlled. Referring to FIGS. 1A an 1B, oven assembly 105 may comprise at least one NRIO 10 plus at least one AOU 110 arranged in series in any sequence. NRIO 10 often occupies the "first" position with one or more AOUs "downstream." An AOU 110 may appear in any position within an oven assembly 105, however, including the "first" position at the feed end of oven assembly 105. Control within an AOU 110a is typically independent from control within any adjacent NRIO 10 or AOU 110b. For example, a relatively long oven assembly may exhibit an excessive temperature drop toward its discharge end. Placing AOU 110 in series after NRIO 10 allows for construction of a longer oven assembly that can maintain generally higher temperatures.

In an embodiment, as shown in FIGS. 9A through 9D, an AOU 110 is an oven of the same general type as NRIO 10 that allows for control over cooking methods and parameters independent from any adjacent NRIO or AOU units. AOU 110 may have—but often omits—a surface-treatment section comprising at least one burner to direct flame into chamber 116 and optionally onto food 41. AOU 110 may have—but often omits—a brander 178 to apply grill marks to the upper surface of the food, lower surface of the food, or both. In the embodiment of FIGS. 9A through 9D, AOU 110 may have a hot-air impingement system similar to that described above for NRIO 10; and it preferably may have a steam-delivery system similar to that described above for NRIO 10. And AOU 110 has a conveyor system such as belt 113 or 213 to transport food 41 from the feed end to the discharge end and (optionally) to apply grill marks to the lower surface of the food.

Figure 10A:
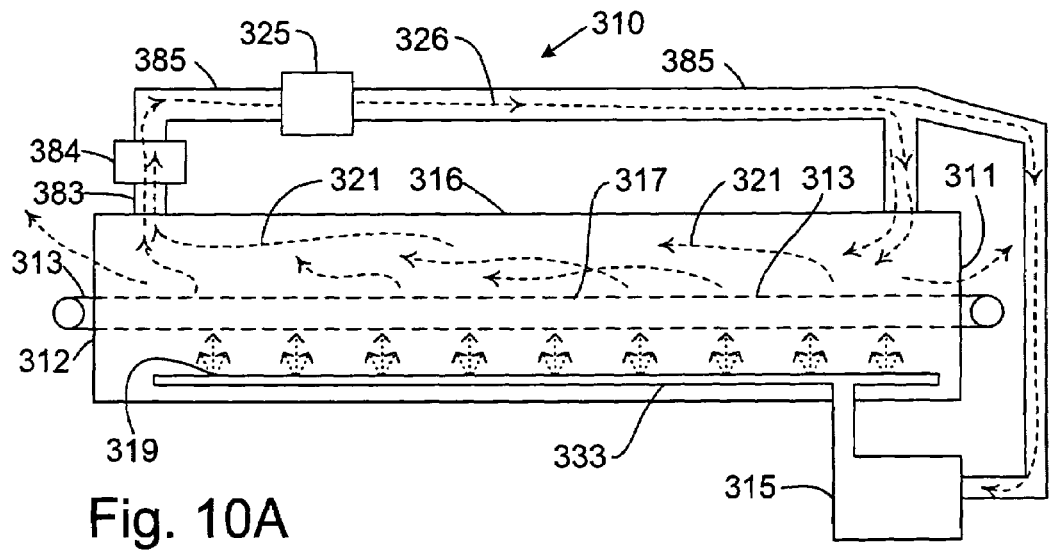
FIG. 10A shows a plan view of another embodiment of an AOU that recirculates cooking vapors and cooks by impingement only.

In certain embodiments, such as that shown in FIG. 10A, AOU 310 is an impingement oven unit that cooks the food substantially by hot air and not by steam. Like other oven units, AOU 310 comprises a feed end 311, a discharge end 312, a cooking chamber 316, and a belt 313 with forward-moving portion 317. To supply hot air for impingement cooking, AOU 310 further comprises hot-air source 315, hot-air manifold 333, and hot-air nozzles 319. AOU 310 may be recirculating or non-recirculating. The embodiment of FIG. 10A is a recirculating AOU. Consequently, recirculation blower 384 pulls cooking vapors 321 through vapor vent 383 and propels recirculated vapors 326 through conduit 385. Burner 325 reheats vapors 326, which are directly or indirectly injected into chamber 316 at the feed end 311 or thereabouts. Some vapors escape AOU 310, mainly through the open feed end and discharge end, where they are typically collected by exhaust hoods (not shown). FIG. 10A shows end-to-end recirculation, but other embodiments may instead employ side-to-side recirculation.

The ability to specify a hot-air-only cooking method in AOU 310, regardless of the method used in adjacent oven units, is a beneficial result of the modular construction of oven assembly 105 according to the present invention. The ability to specify an arbitrary hot-air temperature and pressure level, independent from those of adjacent oven units, is another beneficial result of oven assembly 105. Such AOUs 310 may employ the hot-air impingement system of NRIO 10 or other impingement systems known in the art.

Figure 10B:
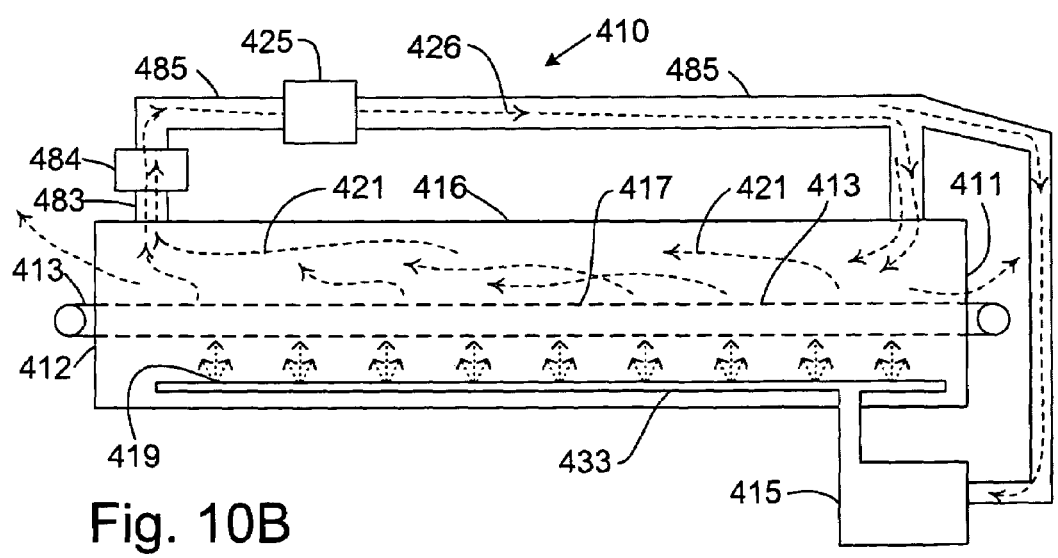
FIG. 10B shows a plan view of another embodiment of an AOU that recirculates cooking vapors and cooks by steam only.

In certain embodiments, as shown in FIG. 10B, AOU 410 is a steam oven unit that cooks the food substantially by steam and not by hot-air impingement. Like other oven units, AOU 410 comprises a feed end 411, a discharge end 412, a cooking chamber 416, and a conveyor belt 413 with forward moving portion 417. To supply steam for cooking, AOU 410 further comprises steam source 415, steam manifold 433, and steam nozzles 319. AOU 310 may be recirculating or non-recirculating. The embodiment of FIG. 10B is a recirculating AOU. Consequently, recirculation blower 484 pulls cooking vapors 421 through vapor vent 483 and propels recirculated vapors 426 through conduit 485. Steam injector 425 adds hot steam to the recirculated vapors 426, which are directly or indirectly reintroduced into chamber 416 at or near its feed end 411. AOU 410 recirculates vapors from end to end, but other embodiments may instead recirculate vapor from side to side.

The ability to specify a steam-air-only cooking method in AOU 410, regardless of the method used in adjacent oven units, is a beneficial result of the modular construction of an oven assembly 105 according to the present invention. As will be detailed later, steam-only cooking may be faster than hot-air impingement cooking, beneficially increasing the capacity of an oven assembly 105 according to the present invention. Such AOUs 410 may employ the steam-delivery system of NRIO 10 or other steam-delivery systems known in the art.

In another embodiment, an AOU is a combined impingement and steam oven. An AOU of this type may employ the impingement system of NRIO 10, AOU 310, or other impingement systems known in the art; and it may simultaneously employ the steam-delivery system of NRIO 10, AOU 410, or other steam-delivery systems known in the art. Some embodiments of such AOUs may recirculate cooking vapors from end to end or from side to side. Other embodiments may exhaust vapors without recirculation.

In certain other embodiments, an AOU is an oven unit that cooks by any combination of direct or indirect flame from one or more burners; surface cooking from direct contact with one or more hot surfaces; stationary hot air; hot-air impingement; convection; steam; infrared radiation; microwave energy; or other cooking methods known in the art.

In certain other embodiments, an AOU may apply a substance to the food that improves its appearance, flavor, or both during cooking. For example, an AOU may add one or more spices, sauces, or other flavor-enhancing or appearance-enhancing substances to food items as they pass by on the conveyor system. Such AOUs may apply such substances instead of, or in addition to, performing any of the cooking operations listed above.

In view of the foregoing, it should be clear that, in installations with multiple AOUs, each AOU may differ in purpose and function.

Common, Separate, and Mixed Conveyor Systems

A conveyor system is the means for transporting food items from the feed end of oven assembly 105 to the discharge end. A conveyor system comprises all food-transporting components that pass food items into the oven assembly, that move food within each NRIO or AOU unit, that transfer food from one NRIO or AOU to the next, and that discharge food items at the terminal end of the oven assembly. At the feed end of oven assembly 105, food items 41 are placed on a conveyor system such as a pervious, continuous, moving belt 13/113/213 that is fabricated from, for example, a plurality of linked rods, of steel, stainless steel, or other construction known in the art. Such moving belts are the typical conveyor system when actually inside an NRIO or AOU according to the present invention, but the phrase "conveyor system" herein encompasses other methods for moving food items. Alternative conveyor systems include moving-pan conveyors, vibratory conveyors, wheel conveyors, screw conveyors, rollers, chutes, and other conveyor systems known in the art.

Each NRIO 10 or AOU 110 may have a separate, independent conveyor system; or the oven assembly 105 may have a common conveyor system passing through at least two oven units; or an oven assembly 105 with multiple NRIOs 10, AOUs 110, or both may combine both approaches, with some oven units having separate conveyor systems and some adjacent oven units having common conveyor systems.

Figure 11A:
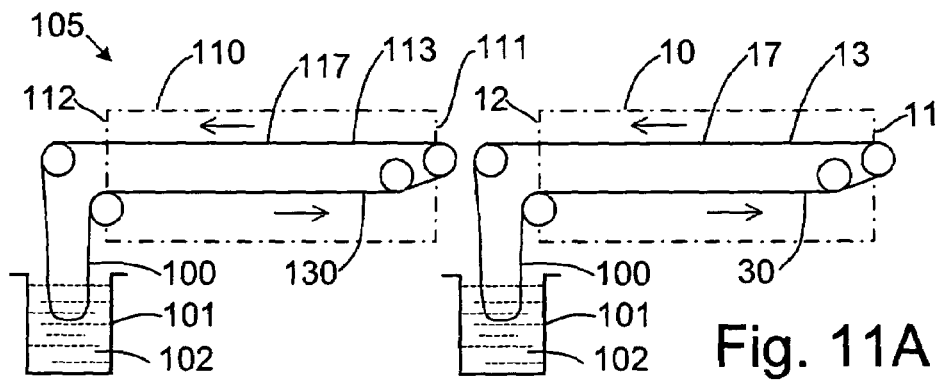
FIG. 11A shows a side view of an oven assembly with an NRIO and AOU having separate conveyor systems.

In an embodiment, as shown in FIGS. 11A and 12A, NRIO 10 has a moving belt 13, and AOU 110 has a separate moving belt 113. NRIO 10 is situated so that discharge end 12 of belt 13 approximately abuts the feed end 111 of belt 113. The upper food-supporting portion 17 of belt 13 moves from feed end to discharge end through cooking chamber 16, and the lower return portion 30 of belt 13 returns to the feed end 11 of NRIO 10. Belt 113 similarly passes through cooking chamber 116. As food 41 passes along the forward-moving portion 17 of belt 13, upper and lower impingement units 18 and 19 pass hot air onto the upper and lower surfaces of food 41. Also, steam nozzle assemblies 62, 70, and 73 pass steam or water vapor into the cooking vapor 21 which forms above and below the food 41.

When food 41 reaches discharge end 12 of NRIO 10, food 41 is transferred from belt 13 to belt 113. Food 41 of sufficient size and stiffness may pass directly across any gap between belts 13 and 113. Alternatively, a chute, transfer conveyer belt, or similar device may be provided between belts 13 and 113 to bridge any gap and to guide food 41 from belt 13 to belt 113. FIG. 12A shows a transition from an NRIO 10 to an AOU 110 via a representative transfer conveyor belt 513.

After food 41 reaches feed end 111 of belt 113, belt 113 carries food 41 through cooking chamber 116, where it passes impingement nozzles 118, 119 and steam nozzles 162, 170, and 173 (if present). Ultimately, food 41 reaches discharge end 112 where it passes out of AOU 110 to NRIO 10b, to another AOU 110b, or to other processing equipment.

In addition to being a conveyance, another possible purpose of a belt is to cause grill marks on the lower surface of food 41. Belt 13/113/213 thus augments brander 78 for both grill marking and direct-contact surface cooking. Embodiments with separate belts are particularly suitable for food products that do not require lower-surface grill marks, or where more than one set of marks is acceptable. A benefit of such embodiments is the ability to run belts 13 and 113 at different rates. For example, different oven units 10, 110a, and 110b may create different cooking conditions as stages of a cooking process. Belt rate and oven length together determine the transit time ("dwell time") through each oven unit. Separate belts 13 and 113 with independent rates lend themselves to tuning the duration of each cooking stage. For another example, many food products shrink during cooking. In this situation, a "later" belt may run slower than an "earlier" belt, tightening product spacing and increasing oven capacity.

Figure 11B:
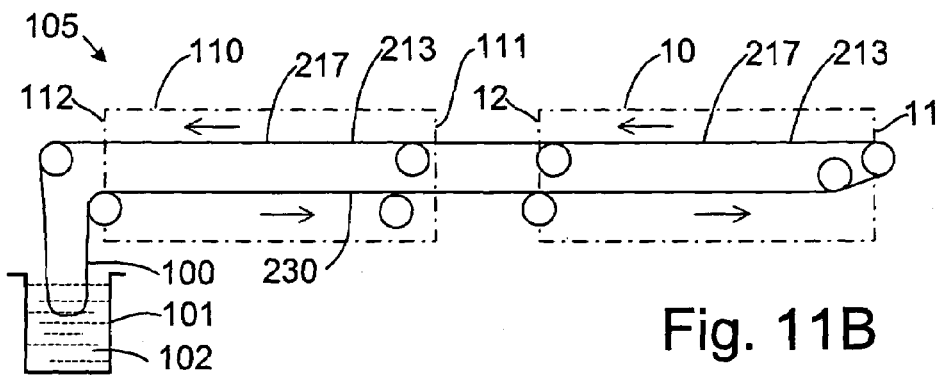
FIG. 11B shows a side view of an oven assembly with an NRIO and AOU having a common conveyor system.
Figure 12B:
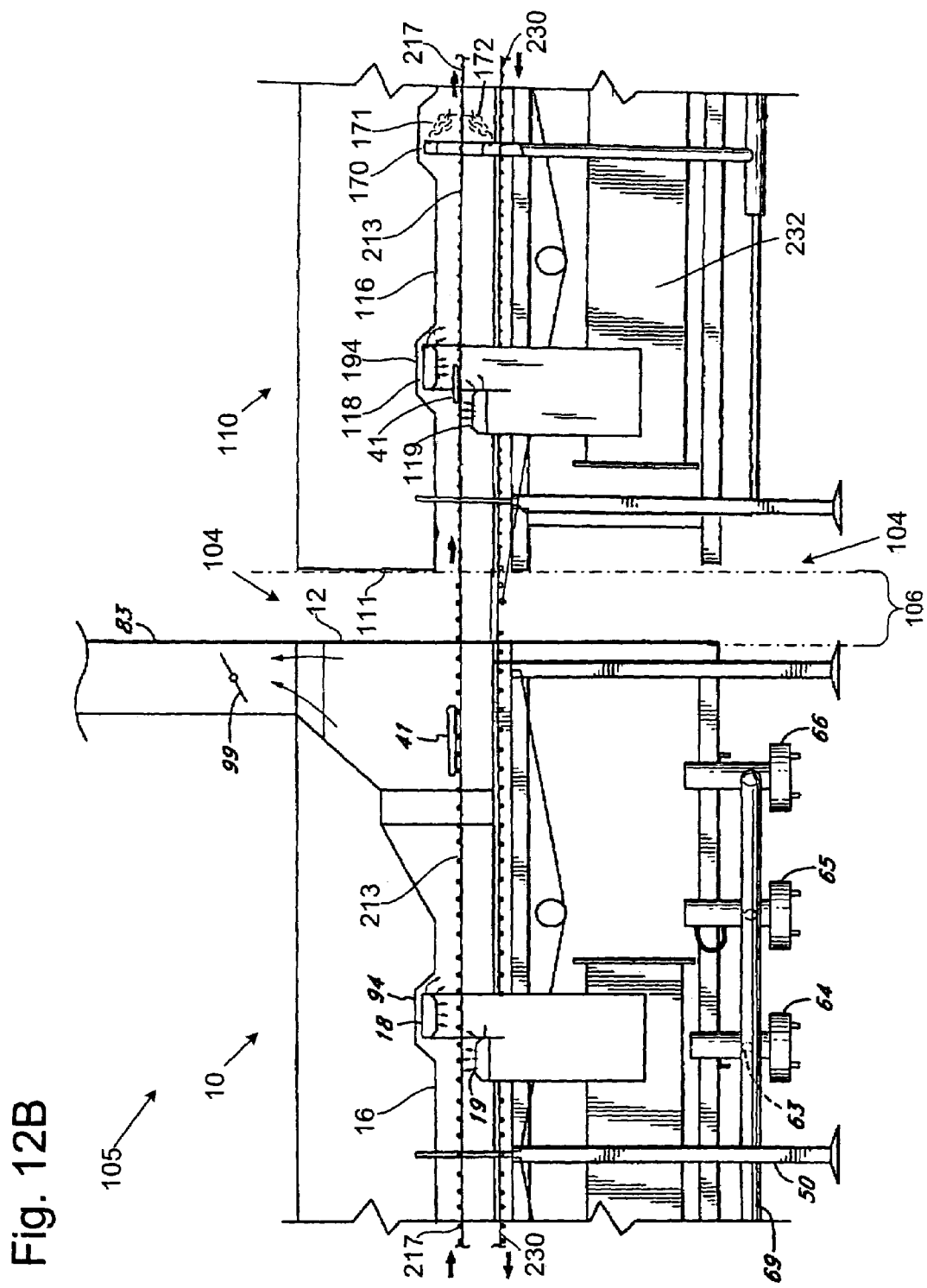
FIG. 12B shows a detail view of a transition from an NRIO to an AOU in a common conveyor system, such as those shown in FIG. 11B.

In another embodiment, shown in FIGS. 11B and 12B, at least two adjacent oven units 10 or 110 share a common conveyor system such as belt 213 having a forward-moving upper portion 217 and a lower return portion 230. For example, NRIO 10 and AOU 110 may share a common belt 213 running continuously through cooking chambers 16 and 116. Embodiments with a common belt 213 are particularly suitable for food products that require a single set of lower-surface grill marks.

As to shipping and assembly, common-belt embodiments may ship with each oven unit having its own portion of belt 213 in place, ready for an on-site assembly step that joins the belt portions into a common belt 213. Separate-belt embodiments, in contrast, may ship with belt 13 or 113 pre-assembled as a continuous loop.

FIGS. 6, 11A, 11B, and 12A also show a belt-cleaning loop 100, which causes belt 13/113/213 to pass through a tank 101 filled with a liquid 102 such as water. Each distinct belt 13/113/213 typically has its own loop 100 and tank 101, typically located at the discharge end of the belt or thereabouts. It has been found that belts 13/113/213 remain relatively clean during most cooking operations. For each belt, non-stick or other coatings may be added to liquid 102.

Certain mechanical details of loop 100 and tank 101 may depend on whether the loop 100 and tank 101 are located in between two oven units or at the ultimate discharge end of oven assembly 105. An intermediate location, near air gap 104 between two oven units, may require tucking loop 100 and tank 101 under the associated NRIO or AOU. FIG. 12A, for example, shows a separate-belt embodiment with an initial NRIO 10 with belt 13 abutting an AOU 110 with belt 113. As a result, the discharge end of belt 13 falls in between NRIO 10 and AOU 110 in the vicinity of gap 104. Loop 100 and tank 101 at the discharge end of belt 13 are therefore nested under the discharge end of NRIO 110 in a space-efficient placement, such as that shown in FIG. 12A.

A terminal location, in contrast, does not necessarily require a space-efficient placement for loop 100 and tank 101. For example, FIG. 6 shows an oven unit located at the ultimate discharge end of oven assembly 105. Belt 13 therefore may extend beyond the discharge end of cooking chamber 16, eliminating the need to tuck loop 100 and tank 101 under the main body of the oven unit.

In a common-belt embodiment, such as that of FIG. 12B, commonly omits loop 100 and tank 101 at the transition between oven units at gap 104. A common-belt embodiment typically has a single loop 100 and tank 101 at the final discharge end of belt 213.

Typical conveyor widths range from 12 inches to 48 inches, but unusually narrow or wide NRIOs 10 or AOUs 110 may require narrower or wider conveyor systems.

In an embodiment, a conveyor system may comprise a plurality of individual conveyors running side by side. Such multiple, parallel conveyors may run at different conveyor rates, so that, for example, an oven assembly may cook two or more distinct products at the same time.

Airflow, Cooking Vapors, and Exhaust

In the single-chamber ovens disclosed in '566 patent, cooking vapors typically are not recirculated but instead pass the entire length of the cooking chamber before being exhausted through a cooking vapor vent positioned the discharge end of the chamber or thereabout. The only significant exhaust venting thus passes through one vent. The surface-treatment burners, impingement units, and steam nozzles constantly add hot air and steam to the chamber. To maintain temperature, a longer oven requires a larger volume of hot air, steam, or both. A longer oven therefore has a larger volume of cooking vapors to be exhausted at the discharge end. As an oven gets longer, it becomes more difficult to pull vapors from the feed end to the discharge end. Exhaust volume eventually limits the length and capacity of the oven.

The phrase "cooking vapors" and the term "vapors," as used herein, include smoke, ambient air, impinged air, steam, gasses, and fumes, as well as aerosol and other suspensions of solid or liquid particles, whether introduced into the oven chamber or emitted by the food during cooking.

In an oven assembly 105 according to the present invention, cooking vapors are not recirculated within a given NRIO or AOU oven unit. Vapors pass substantially the entire length of each oven unit (with the airflow over the food contributing to convective cooking) before being exhausted through one or more cooking vapor vents at the discharge end of each oven unit. For example, referring to FIG. 15, NRIO 10 has vapor sources such as surface-treatment burners 74/76, impingement units 18/19, and steam nozzle assemblies 62/70/73. Vapors 21 generated in NRIO 10 travel substantially the entire length of chamber 16 before being exhausted at discharge end 12 through cooking vapor vent 83, which includes a damper 99 and a blower (not shown).

Similarly, AOU 110 has vapor sources, such as impingement units 118/119 and steam nozzle assemblies 170/173. Vapors 121 generated in AOU 110 travel the entire length of chamber 116 before being exhausted at discharge end 112 through vent 183 equipped with a damper 199 and a blower (not shown). Each additional AOU, if present, has its own vent, if applicable. Some embodiments of AOU 110, such as those adding flavoring agents, do not generate vapors that require venting and may omit vent 183. It is understood that each vent 83 or 183 may be a single or compound vent.

One benefit of separating vent 83 from vent 183 is the ability to support a larger vapor volume (also referred to as "airflow") through oven assembly 105 than a conventional single-chamber, single-vent oven would support. The maximum airflow practical for a given oven installation depends mainly on the size and density of the food product being cooked, but any installation eventually exhibits problems such as difficulty maintaining temperature if airflow gets high enough. As shown in FIG. 15, vent 83 exhausts the portion of vapors 21 from NRIO 10, and vent 183 exhausts the portion of vapors 121 from AOU 110. A conventional oven of the same total length, in contrast, would exhaust the sum of vapors 21 and 121 through its single vent. This sum may exceed the practical maximum vapor volume for the food product being cooked. For example, a test of a 70-foot single-chamber oven that developed about 7,000 CFM of exhaust ejected meat patties along with the cooking vapors.

FIGS. 16A and 16B contrast airflow values inside a prior-art, single-chamber oven and an oven assembly according to the present invention. In both cases, vapor is added to an oven or oven assembly at a rate of 1,000 CFM per ten linear feet. These values are representative and illustrative. Actual rates inside a given oven or oven assembly depend on its length and other factors, and actual rates might not exhibit the precisely linear relationship depicted and described. FIG. 16A shows a prior-art single-chamber oven 70 feet long. At 10 feet, the oven develops 1,000 CFM of vapor volume; at 30 feet, 3,000 CFM, at 50 feet, 5,000 CFM, and at 70 feet, 7,000 CFM.

FIG. 16B, in contrast, shows an oven assembly according to the present invention comprising a first NRIO or AOU oven unit 40 feet long followed by a second NRIO or AOU oven unit 30 feet long. This oven assembly yields the same 70-foot total length as the example of FIG. 16A but yields a lower maximum vapor volume as a result of splitting the oven into two separately vented oven units. At 10 feet, the first oven unit develops 1,000 CFM of vapor volume; and at 30 feet, 3,000 CFM—exactly as before. At 40 feet, however, the first oven unit exhausts its accumulated 4,000 CFM of vapors. The feed end of the second oven unit starts with zero CFM, progressing to 1,000 CFM at ten feet and 3,000 CFM at thirty feet—where the second oven unit vents its accumulated vapors.

Comparing the vapor volume at 50 feet inside the oven of FIG. 16A with the vapor volume at 50 feet inside the oven assembly of FIG. 16B highlights an important difference between the prior art and the present invention. The oven of FIG. 16A develops 5,000 CFM at 50 feet, while the oven assembly of FIG. 16B develops only 1,000 CFM. And at the discharge end, the oven of FIG. 16A develops 7,000 CFM, while the oven assembly of FIG. 16B develops only 3,000 CFM. These lower maximum airflow levels (4,000 CFM and 3,000 CFM instead of 7,000 CFM) reduce the risk of encountering the maximum airflow for a given food product.

Another benefit of a modular oven assembly according to the present invention is that increasing the number of NRIO or AOU oven units increases the number of vents, further subdividing the total airflow. For example, again assuming 1,000 CFM per ten linear feet, a 30-foot NRIO (3,000 CFM) followed by a 20-foot AOU (2,000 CFM) followed by a second 20-foot AOU (2,000 CFM) yields the same 70-foot length and 7,000 CFM grand-total vapor volume as the previous examples. This particular oven assembly reduces the local maximum airflow from 7,000 CFM of FIG. 16A and 4,000 CFM of FIG. 16B to 3,000 CFM at the discharge end of the 30-foot NRIO. An oven assembly according to the present invention thus permits reducing the maximum airflow in each NRIO or AOU oven unit to almost any specified level by selecting the length of the NRIO or AOU unit (in conjunction with the anticipated cooking methods and parameters) according to the desired maximum airflow.

"Capacity" herein refers to the potential throughput of an oven assembly. For example, an oven assembly that can cook 500 steaks per hour has more capacity than one that can cook 100 steaks per hour. "Yield," in contrast, refers to the amount of cooked food produced from a given amount of uncooked food—that is, to the amount of shrinkage during cooking. For example, an oven assembly that renders 50 grams of fat and moisture from each meat patty has a larger yield than one that renders 100 grams of fat from each meat patty.

As mentioned, increasing the capacity of a single-chamber oven usually dictates increasing its length, but increasing length usually increases airflow—which at some point exceeds the practical maximum for the product, indirectly defining a maximum oven capacity for that product. A modular oven assembly according to the present invention substantially eliminates the airflow limitation on length and capacity. A specific, important, and particular advantage of the present invention is the ability to build an oven assembly of almost any length and capacity by subdividing the desired total length into a series of separately vented NRIOs 10 and AOUs 110.

In practice, the improvement in capacity is usually not a linear function of length. For example, in an oven assembly 105 with surface-treatment burners 74, 76 present in NRIO 10 but absent from AOU 110, NRIO 10 is hotter (at least toward feed end 11) than AOU 110. Due to the initial browning stage, NRIO 10 may be "faster" for its length than AOU 110. In practice, a typical improvement in capacity might be about 15 percent for every ten feet.

In practice, increasing oven width does increase belt area and oven capacity, other things being equal. A wider oven requires a higher volume of hot air, steam, or both, however, which is typically delivered through wider impingement units 18, 19 and steam nozzle assembles 62/70/73. The width of an oven unit consequently has little effect on its maximum practical length triggered by airflow issues.

In practice, it is often preferable for the initial oven unit to be longer than the subsequent oven unit, so that the first oven unit performs most of the cooking and subsequent units perform follow-on "finishing" steps. For example, an oven assembly according to the present invention might comprise an initial forty-five foot NRIO (selected as the practical maximum length) with an adjacent thirty-foot AOU or AOUs (selected to efficiently finish cooking). This approximate three-to-two ratio of initial NRIO length to subsequent AOU length represents a common combination based on the desire to maximize the length of the initial oven unit without exceeding airflow limitations.

Another benefit of an oven assembly according to the present invention is believed to be improved fuel efficiency in comparison to a single-chamber oven of the same length. In general, increasing or maintaining temperature at any point along the chamber requires heating the total mass of vapors at that point along the chamber. As an oven or oven unit becomes longer and its airflow increases, the mass of vapors to be heated also increases, as does the amount of fuel required to heat the vapor mass by some predetermined amount. For example, again referring to FIG. 16A, assume a 70-foot single-chamber oven with 1,000 CFM of vapors added for each 10-foot portion and a single exhaust at the discharge end. Ten feet from the feed end, raising the temperature 10° F. (for example) requires heating 1,000 CFM of vapors. At 30 feet, the same 10° F. increase requires heating 3,000 CFM, and at 50 feet, the same 10° F. increase requires heating 5,000 CFM. As airflow increases, heating requires more energy, and it eventually becomes impractical and uneconomical to maintain a given temperature. Ultimately, at some length, the temperature falls too low for efficient cooking.

A modular oven assembly according to the present invention sidesteps this problem because each "upstream" NRIO or AOU oven unit exhausts its airflow at its discharge end. A "downstream" oven unit therefore does not have to reheat all of the vapors introduced at all points upstream. For example, referring to FIG. 16B, assume a 40-foot oven unit followed by a 30-foot oven unit to achieve a 70-foot oven assembly, and further assume 1,000 CFM per 10 linear feet in both oven units. Thirty feet from the feed end of the oven assembly, within the first oven unit, a 10° F. increase requires heating 3,000 CFM of vapors. At 40 feet, the first oven unit expels 4,000 CFM at the transition from the first oven unit to the second oven unit. Fifty feet inside the oven assembly is only 10 feet inside the second oven unit. A 10° F. increase therefore requires heating 1,000 CFM—a large decrease from the 5,000 CFM at 50 feet inside the single-chamber oven of FIG. 16A. In essence, the second oven unit can avoid reheating the 4,000 CFM vapor mass exhausted by the first oven unit. In general, each NRIO or AOU in a modular oven assembly heats only its only its own accumulated vapor mass, and heating these smaller masses yields a significant fuel economy relative to a single-chamber oven of the same total length.

In an embodiment, a modular oven assembly according to the present invention may pass vapors 21 exhausted from one NRIO or AOU oven unit to another upstream or downstream NRIO or AOU. For example, in an oven assembly 105 comprising an NRIO 10 followed by an AOU 110, some or all vapors 21 exhausted through cooking vapor vent 83 may be routed through exhaust ducting to the subsequent AOU 110. These vapors 21 then may be introduced directly into the feed end 111 of AOU 110; or vapors 21 may be directed through conduit 24 for reheating by impingement burner and blower assembly 22/23/25/29 and ultimately to impingement units 18, 19. The exhaust ducting system that redirects vapors 21 or a portion thereof may be adapted to allow the redirected portion to reach ambient pressure, in order to avoid coupling the airflow in the first oven unit to the second oven unit.

Air Gap Between Oven Units

An air gap is the distance between the abutting ends of adjacent NRIO or AOU oven units. Introducing an air-gap between oven units may provide advantages. For example, in the embodiment shown in FIG. 12A, discharge end 12 of NRIO 10 abuts feed end 111 of AOU 110. The separation between discharge end 12 and feed end 111 defines air gap 104. The amount of separation is distance 106. Gap 104 decouples airflow within NRIO 10 from that of AOU 110. For example, gap 104 prevents back-flow of cooking vapors 121 from AOU 110 to NRIO 10 as a result of suction from the blower-driven vapor vent 83. Gap 104 consequently contributes to the ability to maintain distinct cooking conditions in NRIO 10 and AOU 110. Each adjacent pair of oven units has a corresponding intermediate gap 104a through 104n.

Gap 104, and therefore distance 106, must be sufficiently wide to isolate the airflow in one oven unit 10 or 110 from that of the adjacent oven unit 10 or 110. In practice, a gap 104 of about six to twelve inches is sufficient to decouple almost any combination of oven units 10 and 110.

Mechanical considerations may influence the size of gap 104. In FIG. 12B, for example, distance 106 is slightly larger than distance 106 in FIG. 12A, partly as a result of belt-cleaning loop 100 and tank 101. Also, food items 41 tend to lose heat while in gap 104. The time in gap 104 depends on distance 106 and conveyor rate. An excessive time may require the use of a shroud or other insulating means for maintaining temperature while food 41 crosses gap 104.

Oven Units as Independent Cooking Zones

An important benefit of creating a modular oven assembly from a series of NRIO and AOU oven units the ability to create a series of substantially independent cooking zones or regions. In a conventional single-chamber, single-vent oven, all smoke, vapor, hot air, and steam produced or introduced anywhere in the cooking chamber ultimately travels the entire remaining length of the cooking chamber. As shown in FIG. 17A, airflow proceeds from the feed end to the discharge end, so cooking conditions toward the feed end necessarily influence conditions toward the discharge end. The single vent therefore imposes limitations on the possible cooking profiles. For example, a conventional oven cannot cook with moist heat toward the feed end and then cook with dry heat toward the discharge end due to residual humidity flowing "downstream." And temperature typically declines from the feed end to the discharge end, for example, from 1,500° F. to 250° F. as shown in FIG. 17A. All temperature values in FIGS. 17A, 17B, and 17C, are representative values chosen as illustrative examples.

"Cooking parameters" herein refers to measurable values within an NRIO or AOU unit such as temperature, humidity, conveyor rate, dwell time, airflow volume, airflow velocity, and so on. "Cooking methods" herein refers to the heat source or to the technique for applying the heat, such as, direct flame, indirect flame, broiling, direct-contact surface cooking, still air, baking, hot-air impingement, steam, convection, infrared radiation, microwave radiation, and so on. "Cooking conditions" herein refers to the effective combination of cooking parameters and cooking methods within an NRIO or AOU oven unit. "Cooking profile" herein refers to the continuous change in cooking conditions applied to a food product while traveling along a conveyor system in an NRIO or AOU unit.

In an oven assembly according to the present invention, each oven unit is a substantially independent cooking zone with a distinct cooking vapor vent. Cooking parameters and cooking methods consequently may be specified and controlled distinctly in each oven unit. For example, FIG. 17B shows an NRIO 10 that cooks by surface treatment, hot-air impingement, and steam, which together introduce vapors within NRIO 10, which exhausts the vapors via vent 83. As a result of the exhaustion, cooking conditions in NRIO 10 do not pass "downstream" to the adjacent AOU 110a, where fresh hot air, steam, or both establish new, independently controllable cooking conditions.

In the oven assembly of FIG. 17B, for example, AOU 110a has a different cooking method (hot-air only) from NRIO 10. AOU 110a also has distinct cooking parameters from NRIO 10. Focusing on temperature as a representative parameter, the temperature in NRIO 10 declines from 1,500° F. to 400° F. AOU 110a, in contrast, can attain a higher or lower temperature. In FIG. 17B, for example, the AOU 110a starts with a higher temperature (450° F. instead of the 250° F. of FIG. 17A or the 400° F. of NRIO 10 in FIG. 17B) and maintains a high temperature throughout its length.

FIG. 17C shows the independence of each oven unit by way of a contrasting example. In FIG. 17C, NRIO 10 is identical to that of FIG. 17B and shows the same cooking profile. AOU 110b, in contrast, employs a steam-only cooking method instead of the hot-air only method of AOU 110a in FIG. 17B. The temperature profile of FIG. 17C therefore maintains a relatively constant value near that of the steam. This value, shown as 200° F. in FIG. 17C, is lower than the 450 to 400° F. of FIG. 17B but may be more efficient as discussed elsewhere. Taken together, FIGS. 17A, 17B, and 17C show the benefits of zonal control over cooking methods and cooking parameters in an modular oven assembly according to the present invention.

Ovens according to the '566 patent offer a different, limited kind of zonal control, for example, through steam nozzles arranged into independently controllable groups. For example, as shown for an NRIO in FIG. 3, steam valve 64 regulates nozzle assembly 62, valve 65 separately regulates assemblies 70, and valve 66 separately regulates assemblies 73, yielding three steam zones. In this kind of zonal control, the single cooking chamber blurs the distinction between zones, thereby distinguishing limited zonal control from the independent zonal control enabled by the present invention. In oven assembly 105, any oven unit 10, 110 may internally employ limited zonal control in addition to the independent zonal control provided between oven units 10, 110 as disclosed herein.

Cooking Parameters

Single-chamber ovens as disclosed in the '566 patent typically exhibit a temperature gradient from the feed end to the discharge end, in general as shown in FIG. 17A. As the food passes along the cooking chamber, the food tends to draw heat out of the cooking vapors. Although temperature may be as high as 1,000° to 1,600° F. near the feed end of the chamber, it decreases along the chamber. For example, it may drop to 800°, 600°, 400°, and 300° F. along the chamber, so that as the food warms, the temperature difference between the food and the cooking vapors decreases. For some food products, this characteristic reduces the possibility of overcooking in a manner not possible in a typical oven or a recirculating oven, which remains at a relatively constant temperature.

An oven assembly 105 according to the present invention can achieve temperature profiles that differ from this falling gradient, such as, those shown in FIGS. 17B and 17C. Each AOU 110 preferably has independent heat sources (flame, hot air, or steam, in any combination). Each AOU 110 therefore may maintain higher or lower temperatures than those easily attained at the same "distance" inside a conventional oven. For example, a single-chamber oven might be 300° F. at about 30 feet from the feed end. An oven assembly 105 with an AOU 110 starting at about 30 feet might reheat to a higher temperature such as 500° F., for example, as shown in FIG. 17B.

Maintaining a generally higher temperature over the entire oven length may improve the capacity of oven assembly 105 by reducing cooking time. It may also improve yield, for example, by reducing the amount of fat, water, and other juices rendered from food products such as meat patties. The new ability to create non-gradient temperature profiles—including profiles with generally higher temperatures—is an important advantage of the present invention. This improvement in control improves versatility by allowing the oven assembly to cook a wider range of food products and achieve a wider range of cooking effects—with higher capacity, yield, or both.

Cooking Methods

A related important advantage of oven assembly 105 according to the present invention is the ability to control the cooking method of each oven unit 10 or 100 independently. For example, the cooking method in oven unit 10 or 110 may be air-only, steam-only, or any combination of air and steam, regardless of the method employed by its neighbors. This control over methods over the length of oven assembly 105 increases its versatility in contrast to that of conventional ovens, which cannot control the downstream method independently from the upstream method.

A particularly noteworthy method is pure-steam cooking, which is often faster than hot-air cooking because steam cooking drives steam through the food while hot air heats only the food surfaces. In cooking chicken, for example, it was found that steam at 190° F. cooked faster than air at 400° F. For some food products, the ability of steam to penetrate food surfaces to reduce cooking time may depend on preheating food items to a predetermined, product-dependent threshold temperature.

Steam cooking also increases yield by reducing shrinkage of food products in comparison to hot-air impingement or convection cooking. Previous ovens using surface-treatment burners, impingement, or both cannot attain pure-steam cooking toward the discharge end. An oven assembly 105 according to the present invention creates an option to use a pure-steam cooking method any AOU 110. This pure-steam option is a specific advantage of the present invention because it improves capacity, yield, and versatility.

Set Up and Operation

As a result of the several improvements in control over cooking parameters and methods, an oven assembly 105 according to the present invention is in practice easier to set up for a given food product than previous ovens have been. In a modular oven, the regional isolation of parameters and methods reduces interaction among parameters and methods along the length of the oven assembly during set up, allowing the installer or technician to tune parameters and methods as substantially independent variables within each oven unit. Oven assembly 105 enjoys similar advantages for adjustment during daily operation, since the operator faces less interaction among values when adjusting them.

Control Consoles

Figure 13A:
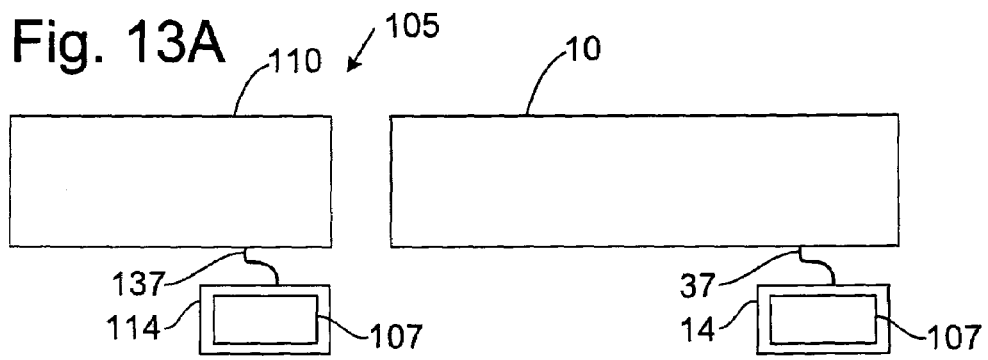
FIG. 13A shows a plan view of an embodiment where an NRIO and AOU have separate control consoles.
Figure 13B:
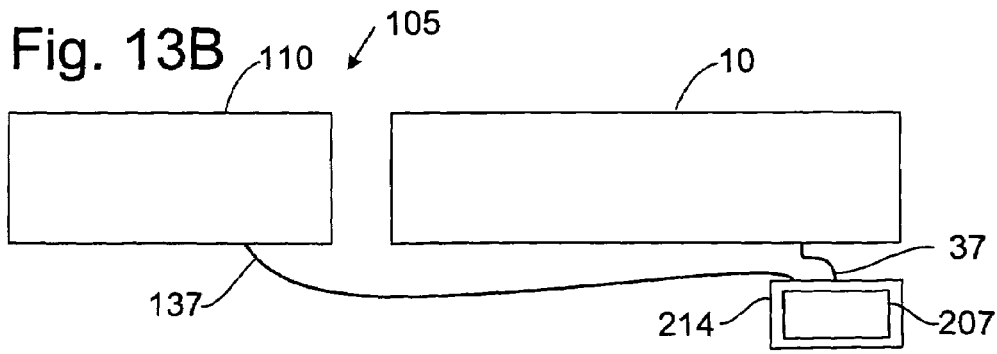
FIG. 13B shows a plan view of an embodiment where an NRIO and AOU have a common control console.

A control console contains the operational controls for one or more oven units. NRIO 10 and each AOU 110 may have separate or common control consoles. In an embodiment, as shown in FIG. 13A, NRIO 10 is operated from control counsel 14, joined to NRIO 10 by signal and power conductors 37; and AOU 110 is operated from a separate control console 114 joined to AOU 110 by signal and power conductors 137. In another embodiment, as shown in FIG. 13B, NRIO 10 and AOU 110 share a common control console 214 joined to NRIO 10 by conductors 37 and to AOU 110 by conductors 137. An oven assembly 105 with multiple NRIOs, multiple AOUs, or both may employ both approaches simultaneously, with certain oven units having separate control consoles 14 and with certain oven units having common control consoles 214.

Figure 14A:
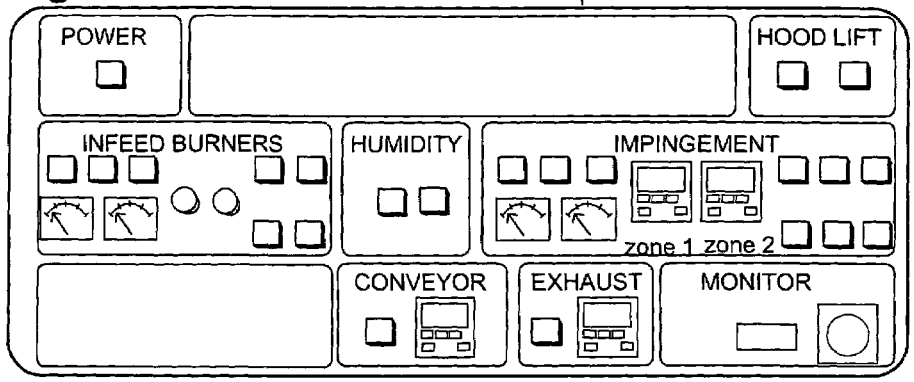
FIG. 14A is a plan view of a control panel of the oven assembly of FIG. 1.

Each control console 14/114/214 typically has set of operational controls (such as switches and valves) and monitoring devices (such as gauges) typically arranged in a control panel. FIG. 14A shows a representative control panel 207 designed as a common control panel for an oven assembly comprising one NRIO and one AOU; and FIG. 14B details the various controls. To provide for a two-zone oven, controls and monitoring units labeled "Zone 1" control NRIO 10, and the controls labeled "Zone 2" control AOU 110. It is understood that many other arrangements are possible for control panels 107 and 207.

Figure 14B:
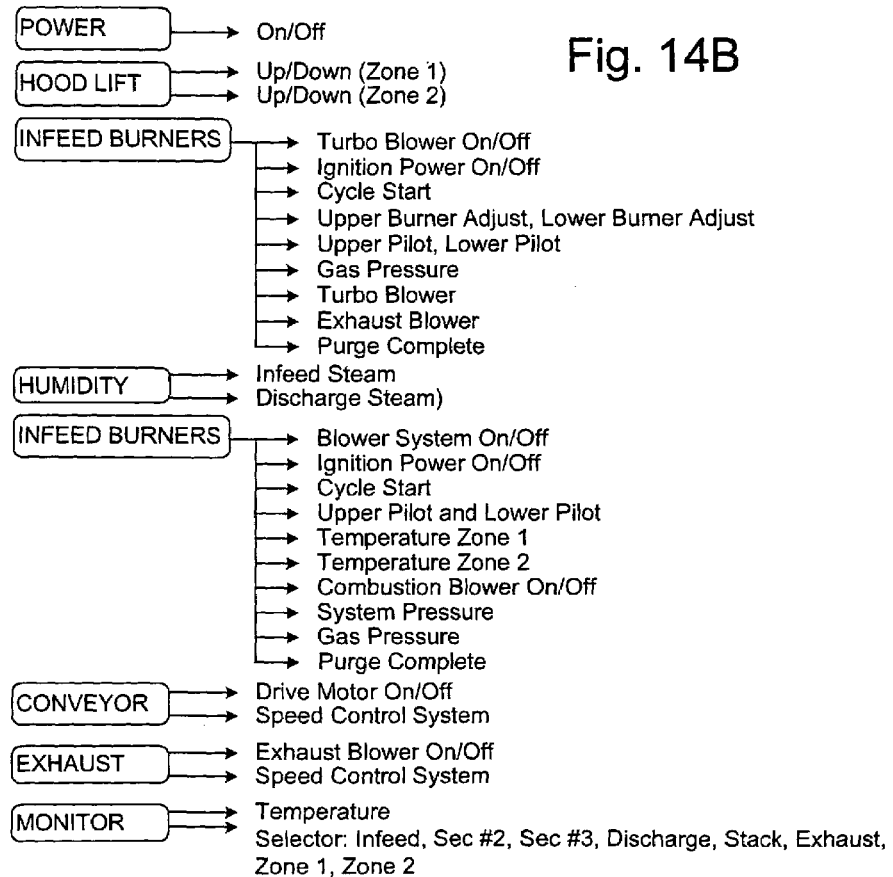
FIG. 14B is a diagrammatic view of the control panel of FIG. 14A.

As detailed in FIG. 14B, oven assembly 105 is provided with numerous means for controlling temperature, air flow, humidity, and conveyor rate (belt speed). Appropriate monitoring units such as pressure-sensing means, thermocouples, and other sensors provide input to control panel 107 or 207 for facilitating the operation of oven assembly 105. Particular note is made of the wide variety of controls available for the NRIO (Zone 1) and AOU (Zone 2). The result is a versatile and efficient continuous-cooking oven assembly that is capable of placing the optimum temperature, time, and humidity together with upper and/or lower air flow impingement on the food to be cooked so that the best possible product will result.

Impingement Consoles

An impingement console contains the burners and blowers that feed the hot-air impingement units for one or more oven units. NRIO 10 and each AOU 110 may have separate or common impingement consoles. Preferably, each NRIO 10 and AOU 110 has a separate impingement console in order to facilitate independent control over hot-air temperature and volume for each oven unit 10, 110. In such embodiments, NRIO 10 has an impingement counsel 15, and AOU 110 has a separate impingement console 115, and so on. In another embodiment, multiple oven units 10, 110 share a common impingement console 215. An oven assembly 105 with multiple NRIOs, multiple AOUs, or both may employ both approaches simultaneously, with one or more oven units having separate impingement consoles 115 and certain groups of two or more oven units having common impingement consoles 215.

Persons skilled in the art will recognize that many modifications and variations are possible in the details, materials, and arrangements of the parts and actions which have been described and illustrated in order to explain the nature of this invention and that such modifications and variations do not depart from the spirit and scope of the teachings and claims contained therein.

What is claimed:

1. An oven assembly comprising:
   at least one non-recirculating impingement oven (NRIO) unit comprising:
      an elongated cooking chamber with a feed end and a discharge end;

a conveyor system for transporting food items from the feed end of the chamber to the discharge end of the chamber;

a plurality of impingement units disposed in the chamber and spaced along at least a portion of the conveyor system, the impingement units adapted to introduce heated air into the chamber and onto the food items from a source external to the chamber; and a cooking-vapor vent at about the discharge end of the chamber; and at least one additional oven unit (AOU) operatively coupled to the adjacent NRIO comprising:

a cooking chamber with a feed end and a discharge end;

a conveyor system for transporting food items from the feed end of the chamber to the discharge end of the chamber;

the AOU providing a set of cooking conditions independently adjustable from those of the NRIO unit; and wherein an AOU is an impingement oven having a plurality of impingement units spaced along the cooking chamber, the impingement units introducing heated air recirculated from within the AOU.

2. The oven assembly of claim 1 wherein an AOU includes a steam-delivery system for introducing steam into the chamber of the AOU.

3. An oven assembly comprising:

at least one non-recirculating impingement oven (NRIO) unit comprising:

an elongated cooking chamber with a feed end and a discharge end;

a conveyor system for transporting food items from the feed end of the chamber to the discharge end of the chamber;

a plurality of impingement units disposed in the chamber and spaced along at least a portion of the conveyor system, the impingement units adapted to introduce heated air into the chamber and onto the food items from a source external to the chamber; and a cooking-vapor vent at about the discharge end of the chamber; and at least one additional oven unit (AOU) operatively coupled to the adjacent NRIO comprising:

a cooking chamber with a feed end and a discharge end;

a conveyor system for transporting food items from the feed end of the chamber to the discharge end of the chamber;

the AOU providing a set of cooking conditions independently adjustable from those of the NRIO unit; and wherein the AOU comprises a steam oven having one or more steam nozzles in the housing, the steam being recirculated from the AOU.

4. An oven assembly comprising:

at least one non-recirculating impingement oven (NRIO) unit comprising:

an elongated cooking chamber with a feed end and a discharge end;

a conveyor system for transporting food items from the feed end of the chamber to the discharge end of the chamber;

a plurality of impingement units disposed in the chamber and spaced along at least a portion of the conveyor system, the impingement units adapted to introduce heated air into the chamber and onto the food items from a source external to the chamber; and a cooking-vapor vent at about the discharge end of the chamber; and at least one additional oven unit (AOU) operatively coupled to the adjacent NRIO comprising:

a cooking chamber with a feed end and a discharge end;

a conveyor system for transporting food items from the feed end of the chamber to the discharge end of the chamber; and the AOU providing a set of cooking conditions independently adjustable from those of the NRIO unit;

wherein the oven assembly has a length exceeding about forty-five feet from the feed end to the discharge end; and wherein the ratio of the length of an NRIO unit to the length of the AOU or AOUs, from feed end to discharge end, is at least about three-to-two.

5. An oven assembly comprising:

at least one NRIO unit, comprising:

an elongated cooking chamber with a feed end and a discharge end;

a conveyor system for transporting food items from the feed end of the chamber to the discharge end of the chamber a plurality of impingement units disposed in the chamber and spaced along at least a portion of the conveyor system, the impingement units adapted to introduce heated air into the cooking chamber onto the food items from a source external to the cooking chamber;

a surface-treatment section for generating flavor-enhancing cooking vapors; and an AOU operatively coupled to the NRIO unit to provide food-processing conditions within a range of conditions provided by the NRIO unit, or a transition from one set of conditions to another set of conditions, the AOU comprising:

a cooking chamber with a feed end and a discharge end; and a conveyor system for transporting food items from the feed end of the chamber to the discharge end of the chamber;

wherein the NRIO vents cooking vapors at a first volume per unit of time and the AOU introduces heated air for processing, over its length, having a total volume per unit of time that is less than that of the first volume per unit of time.

6. A method for continuously cooking food items, comprising:

placing a food item to be cooked on an upper surface of a conveyor system;

heating at least one surface of the food item to be cooked with a flame from a surface-treatment burner;

aiming said flame so that the heat therefrom passes into the entrance of an elongated cooking chamber surrounding said conveyor system, said cooking chamber having a feed end and a discharge end;

passing said food item to be cooked through a plurality of impingement units for introducing hot air and moving the cooking vapors concurrently alone said elongated cooking chamber and said cooking vapors increasing in velocity along said cooking chamber as the foodstuff to be cooked moves from the feed end to the discharge end, the impingement units introducing heated air from a source external to the elongated cooking chamber;

venting said cooking vapors from said cooking chamber near the product-discharge end;

passing the food items to the cooking chamber of an operatively coupled AOU provided with predetermined cooking conditions for the food items; and wherein an AOU comprises a recirculating oven unit.

7. A method of cooking, comprising:

introducing food items into a non-recirculating impingement oven (NRIO) unit having a surface-treatment section for branding or searing the surface of food items, the NRIO having operating conditions such that there is a temperature differential between a feed end and a discharge end, the discharge end having a lower temperature;

cooking the food items a predetermined degree in the NRIO unit short of complete cooking;

venting cooking vapors from about the product-discharge end of the NRIO unit;

transferring the food items from the NRIO unit into an AOU via a conveyor system and introducing a volume of heated air into the cooking chamber of one or more AOU operatively coupled to the NRIO unit, the volume of air per unit of time introduced into the cooking chamber or chambers of the AOU(s) being lower than the volume per unit of time being vented from the NRIO unit at the discharge end but having a higher temperature and being sufficient to complete the cooking of the food items.

8. The method of claim 7 wherein the AOU is an NRIO unit.

9. The method of claim 7 wherein the temperature differential at about the discharge end substantially below an optimal temperature for effective cooking of the food items.

* * * * *

UNITED STATES PATENT AND TRADEMARK OFFICE
CERTIFICATE OF CORRECTION

PATENT NO. : 7,220,944 B2  
APPLICATION NO. : 11/148669  
DATED : May 22, 2007  
INVENTOR(S) : R. Craig Miller et al.

Page 1 of 1

It is certified that error appears in the above-identified patent and that said Letters Patent is hereby corrected as shown below:

Column 6, line 18, enter --a-- between "at" and "different".  
Column 12, line 41, delete "a" from between "of" and "steam".  
Columm13, line, 6, enter --the-- before "length".  
Column 13, line 66, "an" should be -- and -- .  
Column 14, line 25, delete "And" from before "AOU".  
Column 17, line 29, "In a" should be -- A -- .  
Column 17, line 47, enter --at-- between "positioned" and "the".  
Column 21, line 33, enter --is-- between "units" and "the".  
Column 23, line 45, enter --in-- between "method" and "any".  
Column 24, line 11, enter --a-- between "has" and "set".  
Column 26, Claim 5, line 24, add a semi-colon after "chamber".  
Column 28, Claim 9, line 15, enter --is-- between "end" and "substantially".

Signed and Sealed this

Twenty-seventh Day of November, 2007

JON W. DUDAS  
*Director of the United States Patent and Trademark Office*